(12) United States Patent
Shi

(10) Patent No.: US 11,782,237 B2
(45) Date of Patent: *Oct. 10, 2023

(54) CAMERA OPTICAL LENS

(71) Applicant: AAC Optics (Suzhou) Co., Ltd., Suzhou (CN)

(72) Inventor: Rongbao Shi, Shenzhen (CN)

(73) Assignee: AAC Optics (Suzhou) Co., Ltd., Suzhou (CN)

(*) Notice: Subject to any disclaimer, the term of this patent is extended or adjusted under 35 U.S.C. 154(b) by 518 days.

This patent is subject to a terminal disclaimer.

(21) Appl. No.: 17/138,823

(22) Filed: Dec. 30, 2020

(65) Prior Publication Data

US 2022/0066168 A1   Mar. 3, 2022

(30) Foreign Application Priority Data

Sep. 3, 2020   (CN) .......................... 202010917419.9

(51) Int. Cl.
 *G02B 9/62* (2006.01)
 *G02B 13/00* (2006.01)
 *G02B 13/06* (2006.01)
(52) U.S. Cl.
 CPC ........... *G02B 9/62* (2013.01); *G02B 13/0045* (2013.01); *G02B 13/06* (2013.01)

(58) Field of Classification Search
 CPC ...... G02B 9/62; G02B 13/0045; G02B 13/06; G02B 27/0025
 See application file for complete search history.

(56) References Cited

U.S. PATENT DOCUMENTS

| | | | |
|---|---|---|---|
| 2014/0153113 A1* | 6/2014 | Tsai | G02B 9/62 359/713 |
| 2016/0062081 A1* | 3/2016 | Kubota | G02B 13/0045 359/757 |
| 2021/0302702 A1* | 9/2021 | Zhang | G02B 13/0045 |
| 2022/0066169 A1* | 3/2022 | Shi | G02B 13/0045 |

* cited by examiner

*Primary Examiner* — George G. King
(74) *Attorney, Agent, or Firm* — W&G Law Group

(57) ABSTRACT

A camera optical lens includes, from an object side to an image side: a first lens having a positive refractive power, a second lens having a negative refractive power, a third lens having a negative refractive power, a fourth lens, a fifth lens having a positive refractive power and a sixth lens having a negative refractive power. The camera optical lens satisfies conditions of $1.00 \leq (d1+d3+d5+d7+d9)/d11 \leq 2.20$ and $(R5+R6)/(R5-R6) \leq -1.00$, here d1, d3, d5, d7 and d9 denote an on-axis thickness of the first, the second, the third, the fourth, the fifth, and the sixth lenses, respectively, R5 denotes a curvature radius of an object-side surface of the third lens, and R6 denotes a curvature radius of an image-side surface of the third lens. The camera optical lens of the present disclosure has excellent optical performances, and meanwhile can meet design requirements of a large aperture, a wide angle and ultra-thin.

10 Claims, 12 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece lens and seven-piece lens structure gradually appear in lens designs. Although the six-piece lens already has good optical performance, its focal power, lens spacing and lens shape are still unreasonable, resulting in the lens structure still cannot meet the design requirements of a large aperture, ultra-thin and a wide angle while having good optical performance.

SUMMARY

In view of above problems, an objective of the present disclosure is to provide a camera optical lens, which has excellent optical performances, and meanwhile can meet design requirements of a large aperture, a wide angle and ultra-thin.

To solve the above problems, some embodiments of the present disclosure is to provides a camera optical lens including, from an object side to an image side, a first lens having a positive refractive power, a second lens having a negative refractive power, a third lens having a negative refractive power, a fourth lens, a fifth lens having a positive refractive power, and a sixth lens having a negative refractive power.

The camera optical lens satisfies conditions of $1.00 \leq (d1+d3+d5+d7+d9)/d11 \leq 2.20$ and $(R5+R6)/(R5-R6) \leq -1.00$. Herein d1 denotes an on-axis thickness of the first lens, d3 denotes an on-axis thickness of the second lens, d5 denotes an on-axis thickness of the third lens, d7 denotes an on-axis thickness of the fourth lens, d9 denotes an on-axis thickness of the fifth lens, d11 denotes an on-axis thickness of the sixth lens, R5 denotes a curvature radius of an object-side surface of the third lens, and R6 denotes a curvature radius of an image-side surface of the third lens.

Preferably, the camera optical lens further satisfying following condition: $-2.10 \leq f2/f \leq -1.00$. Herein f denotes a focal length of the camera optical lens, and f2 denotes a focal length of the second lens.

Preferably, the camera optical lens further satisfies a condition of $-3.00 \leq R10/R9 \leq -1.00$. Herein R9 denotes a curvature radius of an object-side surface of the fifth lens, and R10 denotes a curvature radius of an image-side surface of the fifth lens.

Preferably, the camera optical lens further satisfies conditions of $0.27 \leq f1/f \leq 1.45$, $-1.10 \leq (R1+R2)/(R1-R2) \leq 0.33$, and $0.03 \leq d1/TTL \leq 0.10$. Herein f1 denotes a focal length of the first lens, R1 denotes a curvature radius of an object-side surface of the first lens, R2 denotes a curvature radius of an image-side surface of the first lens, and TTL denotes a total optical length from the object-side surface of the first lens to an image surface of the camera optical lens along an optical axis.

Preferably, the camera optical lens further satisfies conditions of $1.49 \leq (R3+R4)/(R3-R4) \leq 5.29$ and $0.01 \leq d3/TTL \leq 0.05$. Herein R3 denotes a curvature radius of an object-side surface of the second lens, and R4 denotes a curvature radius of an image-side surface of the second lens.

Preferably, the camera optical lens further satisfies conditions of $-799.68 \leq f3/f \leq -0.60$ and $0.01 \leq d5/TTL \leq 0.06$. Herein f3 denotes a focal length of the third lens.

Preferably, the camera optical lens further satisfies conditions of $-25.39 \leq f4/f \leq 53.93$, $-185.55 \leq (R7+R8)/(R7-R8) \leq 30.09$, and $0.01 \leq d7/TTL \leq 0.04$. Herein f4 denotes a focal length of the fourth lens, R7 denotes a curvature radius of an object-side surface of the fourth lens, and R8 denotes a curvature radius of an image-side surface of the fourth lens.

Preferably, the camera optical lens further satisfies conditions of $0.39 \leq f5/f \leq 1.33$, $-0.99 \leq (R9+R10)/(R9-R10) \leq -0.02$, and $0.02 \leq d9/TTL \leq 0.14$. Herein f5 denotes a focal length of the fifth lens, R9 denotes a curvature radius of an object-side surface of the fifth lens, and R10 denotes a curvature radius of an image-side surface of the fifth lens.

Preferably, the camera optical lens further satisfies conditions of $-1.18 \leq f6/f \leq -0.54$, $0.03 \leq (R11+R12)/(R11-R12) \leq 0.39$, and $0.06 \leq d11/TTL \leq 0.29$. Herein f6 denotes a focal length of the sixth lens, R11 denotes a curvature radius of an object-side surface of the sixth lens, and R12 denotes a curvature radius of an image-side surface of the sixth lens.

Preferably, the camera optical lens further satisfies a condition of $TTL/IH \leq 1.95$. Herein IH denotes an image height of the camera optical lens.

Advantageous effects of the present disclosure are that, the camera optical lens has excellent optical performances, and also has a large aperture, a wide angle, and is ultra-thin. The camera optical lens is especially suitable for mobile camera lens components and WEB camera lens composed of high pixel CCD, CMOS.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

Embodiment 1

Figure 1:
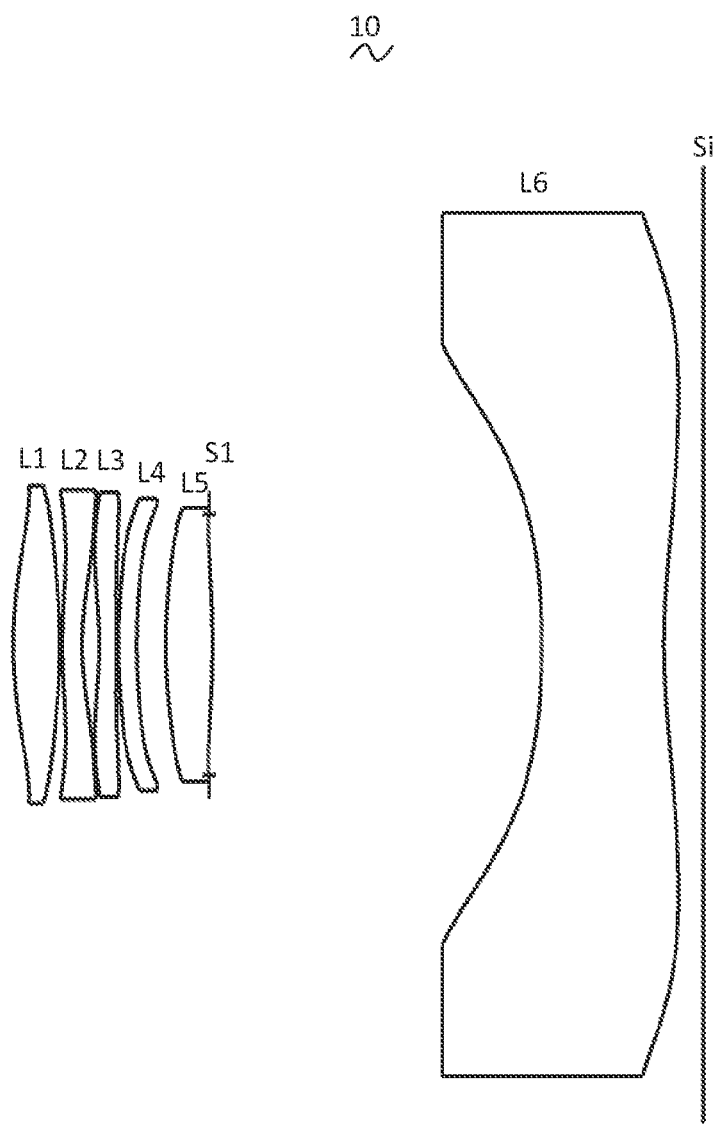
FIG. 1 shows a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, the camera optical lens 10 includes six lenses. Specifically, the camera optical lens 10 includes, from an object side to an image side: a first lens L1, a second lens L2, a third lens L3, a fourth lens L4, a fifth lens L5, an aperture S1, a sixth lens L6, and an image surface Si. Optical elements such filters may be arranged between the sixth lens L6 and the image surface Si.

In the embodiment, the first lens L1 has a positive refractive power, the second lens L2 has a negative refractive power, the third lens L3 has a negative refractive power, the fourth lens L4 has a negative refractive power, the fifth lens L5 has a positive refractive power, and the sixth lens L6 has a negative refractive power.

In the embodiment, the first lens L1, the second lens L2, the third lens L3, the fourth lens L4, the fifth lens L5, and the sixth lens L6 are all made of plastic material.

Herein, an on-axis thickness of the first lens L1 is defined as d1, an on-axis thickness of the second lens L2 is defined as d2, an on-axis thickness of the third lens L3 is defined as d5, an on-axis thickness of the fourth lens L4 is defined as d7, an on-axis thickness of the fifth lens L5 is defined as d9, an on-axis thickness of the sixth lens L6 is defined as d11, and the camera optical lens 10 should satisfy following condition: $1.00 \leq (d1+d3+d5+d7+d9)/d11 \leq 2.20$. When $(d1+d3+d5+d7+d9)/d11$ meets the condition, the thickness of each lens can be effectively distributed, thereby facilitating lens assembly and processing.

A curvature radius of an object-side surface of the third lens L3 is defined as R5, a curvature radius of an image-side surface of the third lens L3 is defined as R6, and the camera optical lens 10 satisfies a condition of $(R5+R6)/(R5-R6) \leq -1.00$, which stipulates a shape of the third lens L3, within this range, it is beneficial to aberration correction and image quality improvement.

A focal length of the camera optical lens 10 is defined as f, a focal length of the second lens L2 is defined as f2, and the camera optical lens 10 satisfies a condition of $-2.10 \leq f2/f \leq -1.00$, which specifies a ratio of the focal length of the second lens L2 to the focal length of the camera optical lens 10, within this range, it is beneficial to improve performance of an optical system.

A curvature radius of an object-side surface of the fifth lens L5 is defined as R9, a curvature radius of an image-side surface of the fifth lens L5 is defined as R10, and the camera optical lens 10 satisfies a condition of $-3.00 \leq R10/R9 \leq -1.00$, which stipulates a shape of the fifth lens L5. Within this range, a degree of deflection of light passing through the lens can be alleviated, and aberrations can be reduced effectively.

In the embodiment, an object-side surface of the first lens L1 is convex in a paraxial region, and an image-side surface of the first lens L1 is convex in the paraxial region.

A focal length of the first lens L1 is defined as f1, and the camera optical lens 10 satisfies a condition of $0.27 \leq f1/f \leq 1.45$. By controlling the positive refractive power of the first lens L1 within a reasonable range, which can beneficial to correct an aberration of the optical system. Preferably, the camera optical lens 10 further satisfies a condition of $0.44 \leq f1/f \leq 1.16$.

A curvature radius of the object-side surface of the first lens L1 is defined as R1, a curvature radius of the image-side surface of the first lens L1 is defined as R2, and the camera optical lens 10 satisfies condition of $-1.10 \leq (R1+R2)/(R1-R2) \leq 0.33$, which stipulates a shape of the first lens L1. Within this range, a development towards ultra-thin and a wide angle lenses would facilitate correcting a problem of an on-axis aberration. Preferably, the camera optical lens 10 further satisfies a condition of $-0.68 \leq (R1+R2)/(R1-R2) \leq 0.26$.

A total optical length from the object-side surface of the first lens to an image surface of the camera optical lens 10 along an optical axis is defined as TTL, and the camera optical lens 10 satisfies a condition of $0.03 \leq d1/TTL \leq 0.10$. Within this range, it is beneficial to achieve ultra-thin. Preferably, the camera optical lens 10 further satisfies a condition of $0.04 \leq d1/TTL \leq 0.08$.

In the embodiment, an object-side surface of the second lens L2 is convex in the paraxial region, and an image-side surface of the second lens L2 is concave in the paraxial region.

A curvature radius of the object-side surface of the second lens L2 is defined as R3, a curvature radius of the image-side surface of the second lens L2 is defined as R4, and the camera optical lens 10 satisfies a condition of $1.49 \leq (R3+R4)/(R3-R4) \leq 5.29$, which stipulates a shape of the second lens L2. Within this range, a development towards ultra-thin and a wide angle lenses would facilitate correcting a problem of an on-axis aberration. Preferably, the camera optical lens 10 further satisfies a condition of $2.38 \leq (R3+R4)/(R3-R4) \leq 4.23$.

Furthermore, the camera optical lens 10 satisfies a condition of $0.01 \leq d3/TTL \leq 0.05$, within this range, it is beneficial to achieve ultra-thin. Preferably, the camera optical lens 10 further satisfies a condition of $0.02 \leq d3/TTL \leq 0.04$.

In the embodiment, an object-side surface of the third lens L3 is concave in the paraxial region, and an image-side surface of the third lens L3 is convex in the paraxial region.

A focal length of the third lens L3 is defined as f3, and the camera optical lens 10 satisfies a condition of $-799.68 \leq f3/f \leq -0.60$. By controlling the positive refractive power of the third lens L3 within a reasonable range, which can beneficial to correct an aberration of the optical system. Preferably, the camera optical lens 10 further satisfies a condition of $-499.80 \leq f3/f \leq -0.75$.

Furthermore, the camera optical lens 10 satisfies a condition of $0.01 \leq d5/TTL \leq 0.06$, within this range, it is beneficial to achieve ultra-thin. Preferably, the camera optical lens 10 further satisfies a condition of $0.02 \leq d5/TTL \leq 0.04$.

In the embodiment, an object-side surface of the fourth lens L4 is convex in the paraxial region, and an image-side surface of the fourth lens L4 is concave in the paraxial region.

A focal length of the fourth lens L4 is defined as f4, and the camera optical lens 10 satisfies a condition of $-25.39 \leq f4/f \leq 53.93$, which specifies a ratio of the focal length of the fourth lens L4 to the focal length f of the camera optical lens 10, within this range, it is beneficial to improve the performance of the optical system. Preferably, the camera optical lens 10 further satisfies a condition of $-15.87 \leq f4/f \leq 43.14$.

A curvature radius of the object-side surface of the fourth lens L4 is defined as R7, a curvature radius of the image-side surface of the fourth lens L4 is defined as R8, and the camera optical lens 10 satisfies a condition of $-185.55 \leq (R7+R8)/(R7-R8) \leq 30.09$, which stipulates a shape of the fourth lens L4. Within this range, a development towards ultra-thin and a wide angle lenses would facilitate correcting the problem of the off-axis aberration. Preferably, the camera optical lens 10 further satisfies a condition of $-115.97 \leq (R7+R8)/(R7-R8) \leq 24.07$.

A curvature radius of the object-side surface of the fourth lens L4 is d7, and the camera optical lens 10 satisfies a condition of $0.01 \leq d7/TTL \leq 0.05$. Within this range, it is beneficial to achieve ultra-thin. Preferably, the camera optical lens 10 further satisfies a condition of $0.02 \leq d7/TTL \leq 0.04$.

In the embodiment, an object-side surface of the fifth lens L5 is convex in the paraxial region, and an image-side surface of the fifth lens L5 is convex in the paraxial region.

A focal length of the fifth lens L5 is defined as f5, and the camera optical lens 10 satisfies a condition of $0.39 \leq f5/f \leq 1.33$. The limitation of the fifth lens L5 can effectively make a light angle of the camera optical lens smooth and reduce a tolerance sensitivity. Preferably, the camera optical lens 10 further satisfies a condition of $0.62 \leq f5/f \leq 1.06$.

A curvature radius of the object-side surface of the fifth lens L5 is defined as R9, a curvature radius of the image-side surface of the fifth lens L5 is defined as R10, and the camera optical lens 10 satisfies a condition of $-0.99 \leq (R9+R10)/(R9-R10) \leq -0.02$, which stipulates a shape of the fifth lens L5. Within this range, a development towards ultra-thin and a wide angle lenses would facilitate correcting a problem of an on-axis aberration. Preferably, the camera optical lens 10 further satisfies a condition of $-0.62 \leq (R9+R10)/(R9-R10) \leq -0.03$.

An on-axis thickness of the fifth lens L5 is defined as d9, and the camera optical lens 10 satisfies a condition of $0.02 \leq d9/TTL \leq 0.14$. Within this range, it is beneficial to achieve ultra-thin. Preferably, the camera optical lens 10 further satisfies a condition of $0.04 \leq d9/TTL \leq 0.11$.

In the embodiment, an object-side surface of the sixth lens L6 is concave in the paraxial region, and an image-side surface of the sixth lens L6 is concave in the paraxial region.

A focal length of the sixth lens L6 is defined as f6, and the camera optical lens 10 satisfies a condition of $-1.18 \leq f6/f \leq -0.54$. Through a reasonable distribution of the focal length, which can make the system has a better imaging quality and a lower sensitivity. Preferably, the camera optical lens 10 further satisfies a condition of $-1.13 \leq f6/f \leq -0.68$.

A curvature radius of the object-side surface of the sixth lens L6 is defined as R11, a curvature radius of the image-side surface of the sixth lens L6 is defined as R12, and the camera optical lens 10 satisfies a condition of $0.03 \leq (R11+R12)/(R11-R12) \leq 0.39$, which stipulates a shape of the sixth lens L6. Within this range, a development towards ultra-thin and a wide angle lenses would facilitate correcting the problem of the off-axis aberration. Preferably, the camera optical lens 10 further satisfies a condition of $0.05 \leq (R11+R12)/(R11-R12) \leq 0.31$.

An on-axis thickness of the sixth lens L6 is defined as d11, and the camera optical lens 10 satisfies a condition of $0.06 \leq d11/TTL \leq 0.29$, within this range, it is beneficial to achieve ultra-thin. Preferably, the camera optical lens 10 further satisfies a condition of $0.09 \leq d11/TTL \leq 0.23$.

In the embodiment, an image height of the camera optical lens 10 is defined as IH, and the camera optical lens 10 satisfies a condition of $TTL/IH \leq 1.95$, which is beneficial to achieve ultra-thin.

In the embodiment, an field of view (FOV) the camera optical lens 10 is greater than or equal to 60.00°, thereby achieving a wide angle.

In the embodiment, an F number (FNO) of the camera optical lens 10 is less than or equal to 2.50, thus achieving a wide aperture and the camera optical lens has excellent imaging performance.

In the embodiment, a combined focal length of the first lens L1 and the second lens L2 is defined as f12, and the camera optical lens 10 further satisfies a condition of $0.36 \leq f12/f \leq 6.35$. Within this range, it can eliminate an aberration and a distortion of the camera optical lens and reduce a back focal length of the camera optical lens, thereby maintaining miniaturization of the camera optical lens. Preferably, the camera optical lens 10 further satisfies a condition of $0.58 \leq f12/f \leq 5.08$.

When the camera optical lens 10 satisfies the above conditions, which makes the camera optical lens has excellent optical performance, and meanwhile, the camera optical lens also satisfies design requirements of a large aperture, a wide angle and ultra-thin. According to the characteristics of the camera optical lens, it is particularly suitable for mobile phone imaging lens assemblies and WEB imaging lenses composed of high-resolution CCD, CMOS and other imaging elements.

In the following, embodiments will be used to describe the camera optical lens 10 of the present disclosure. The symbols recorded in each embodiment will be described as follows. The focal length, on-axis distance, curvature radius, on-axis thickness, inflexion point position, and arrest point position are all in units of mm.

TTL: Optical length (the total optical length from the object-side surface of the first lens L1 to the image surface S1 of the camera optical lens along the optical axis) in mm.

The F number (FNO) means a ratio of an effective focal length of the camera optical lens to an entrance pupil diameter (ENPD).

Preferably, inflexion points and/or arrest points can be arranged on the object-side surface and/or the image-side surface of the lens, so as to satisfy the demand for high quality imaging. The description below can be referred for specific implementations.

Table 1 and Table 2 show design data of the camera optical lens 10 shown in FIG. 1.

TABLE 1

|  | R | d |  | nd |  | vd |
|---|---|---|---|---|---|---|
| S1 | ∞ | d0= | −3.680 |  |  |  |
| R1 | 6.686 | d1= | 0.869 | nd1 | 1.5444 | v1 55.82 |
| R2 | −9.310 | d2= | 0.053 |  |  |  |
| R3 | 7.968 | d3= | 0.370 | nd2 | 1.6400 | v2 23.54 |
| R4 | 4.177 | d4= | 0.325 |  |  |  |
| R5 | −5.506 | d5= | 0.326 | nd3 | 1.5444 | v3 55.82 |
| R6 | −18.591 | d6= | 0.030 |  |  |  |
| R7 | 8.224 | d7= | 0.345 | nd4 | 1.6400 | v4 23.54 |
| R8 | 7.443 | d8= | 0.551 |  |  |  |
| R9 | 7.898 | d9= | 0.881 | nd5 | 1.5444 | v5 55.82 |
| R10 | −14.125 | d10= | 6.200 |  |  |  |
| R11 | −11.627 | d11= | 2.302 | nd6 | 1.5444 | v6 55.82 |
| R12 | 10.005 | d12= | 0.789 |  |  |  |

Herein, meanings of various symbols will be described as follows.

S1: aperture.
R: curvature radius of an optical surface, a central curvature radius for a lens.
R1: curvature radius of the object-side surface of the first lens L1.
R2: curvature radius of the image-side surface of the first lens L1.
R3: curvature radius of the object-side surface of the second lens L2.
R4: curvature radius of the image-side surface of the second lens L2.
R5: curvature radius of the object-side surface of the third lens L3.
R6: curvature radius of the image-side surface of the third lens L3.
R7: curvature radius of the object-side surface of the fourth lens L4.
R8: curvature radius of the image-side surface of the fourth lens L4.
R9: curvature radius of the object-side surface of the fifth lens L5.
R10: curvature radius of the image-side surface of the fifth lens L5.
R11: curvature radius of the object-side surface of the sixth lens L6.
R12: curvature radius of the image-side surface of the sixth lens L6.
d: on-axis thickness of a lens and an on-axis distance between lens.
d0: on-axis distance from the aperture S1 to the object-side surface of the first lens L1.
d1: on-axis thickness of the first lens L1.
d2: on-axis distance from the image-side surface of the first lens L1 to the object-side surface of the second lens L2.
d3: on-axis thickness of the second lens L2.
d4: on-axis distance from the image-side surface of the second lens L2 to the object-side surface of the third lens L3.
d5: on-axis thickness of the third lens L3.
d6: on-axis distance from the image-side surface of the third lens L3 to the object-side surface of the fourth lens L4.
d7: on-axis thickness of the fourth lens L4.
d8: on-axis distance from the image-side surface of the fourth lens L4 to the object-side surface of the fifth lens L5.
d9: on-axis thickness of the fifth lens L5.
d10: on-axis distance from the image-side surface of the fifth lens L5 to the object-side surface of the sixth lens L6.
d11: on-axis thickness of the sixth lens L6.
d12: on-axis distance from the image-side surface of the sixth lens L6 to the image surface Si.
nd: refractive index of a d line.
nd1: refractive index of the d line of the first lens L1.
nd2: refractive index of the d line of the second lens L2.
nd3: refractive index of the d line of the third lens L3.
nd4: refractive index of the d line of the fourth lens L4.
nd5: refractive index of the d line of the fifth lens L5.
nd6: refractive index of the d line of the sixth lens L6.
vd: abbe number.
v1: abbe number of the first lens L1.
v2: abbe number of the second lens L2.
v3: abbe number of the third lens L3.
v4: abbe number of the fourth lens L4.
v5: abbe number of the fifth lens L5.
v6: abbe number of the sixth lens L6.

Table 2 shows aspherical surface data of each lens of the camera optical lens 10 in Embodiment 1 of the present disclosure.

TABLE 2

|  | Conic coefficient | Aspheric surface coefficients | | | | |
|---|---|---|---|---|---|---|
|  | k | A4 | A6 | A8 | A10 | A12 |
| R1 | −1.3437E+00 | −1.5536E−03 | −2.1814E−04 | −5.2204E−05 | 1.2918E−05 | −2.6322E−06 |
| R2 | −2.9453E+00 | 6.3210E−03 | −1.7179E−03 | 4.2092E−04 | −8.5913E−05 | 1.0250E−05 |
| R3 | −5.3541E+01 | −7.0062E−03 | −1.6288E−03 | 5.7945E−04 | −6.2548E−05 | 4.5028E−08 |
| R4 | −1.2605E+01 | −7.0590E−03 | −4.0186E−04 | 2.4459E−04 | −4.8338E−05 | 1.1826E−05 |
| R5 | 3.0483E−01 | 3.8612E−02 | −9.8656E−03 | 2.6323E−03 | −6.2004E−04 | 1.0376E−04 |
| R6 | −1.0500E+02 | 2.7458E−02 | −1.2052E−02 | 3.7483E−03 | −8.8959E−04 | 1.4240E−04 |
| R7 | −2.3143E+00 | −1.0860E−02 | 2.3150E−03 | 7.7643E−04 | −3.2449E−04 | 5.7035E−05 |
| R8 | 5.8900E−01 | −1.6647E−02 | 5.6862E−03 | −5.8196E−04 | 7.8285E−05 | −1.5366E−05 |
| R9 | 6.4645E+00 | −7.2346E−03 | 5.7069E−04 | 2.1933E−04 | −7.0607E−05 | 1.2945E−05 |

TABLE 2-continued

| | | | | | |
|---|---|---|---|---|---|
| R10 | −6.7262E+00 | 2.1573E−03 | −1.8750E−04 | 3.3696E−04 | −1.1731E−04 | 2.9610E−05 |
| R11 | 6.7997E−01 | −4.1925E−03 | 3.3408E−04 | −3.5891E−05 | 2.7299E−06 | −1.1609E−07 |
| R12 | −3.2136E+01 | −1.3375E−03 | 6.5269E−05 | −2.3302E−06 | 3.9282E−08 | −2.4623E−10 |

| | Conic coefficient | Aspheric surface coefficients | | | |
|---|---|---|---|---|---|
| | k | A14 | A16 | A18 | A20 |
| R1 | −1.3437E+00 | 1.6917E−07 | 0.0000E+00 | 0.0000E+00 | 0.0000E+00 |
| R2 | −2.9453E+00 | −7.0759E−07 | 2.3418E−08 | 0.0000E+00 | 0.0000E+00 |
| R3 | −5.3541E+01 | 5.3316E−07 | −3.0860E−08 | 0.0000E+00 | 0.0000E+00 |
| R4 | −1.2605E+01 | −1.6873E−06 | 8.3532E−08 | 0.0000E+00 | 0.0000E+00 |
| R5 | 3.0483E−01 | −9.4894E−06 | 3.3123E−07 | 0.0000E+00 | 0.0000E+00 |
| R6 | −1.0500E+02 | −1.2920E−05 | 4.7713E−07 | 0.0000E+00 | 0.0000E+00 |
| R7 | −2.3143E+00 | −5.6157E−06 | 2.2690E−07 | 0.0000E+00 | 0.0000E+00 |
| R8 | 5.8900E−01 | 1.1650E−06 | −3.3971E−08 | 0.0000E+00 | 0.0000E+00 |
| R9 | 6.4645E+00 | −1.3020E−06 | 3.5595E−08 | 0.0000E+00 | 0.0000E+00 |
| R10 | −6.7262E+00 | −3.7316E−06 | 1.7736E−07 | 0.0000E+00 | 0.0000E+00 |
| R11 | 6.7997E−01 | 2.7001E−09 | −2.6990E−11 | 0.0000E+00 | 0.0000E+00 |
| R12 | −3.2136E+01 | −2.3444E−12 | 6.5758E−14 | −4.1038E−16 | 0.0000E+00 |

Herein, K is a conic coefficient, and A4, A6, A8, A10, A12, A14, A16, A18, and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Herein, x is a vertical distance between a point on an aspheric curve and the optical axis, and y is a depth of the aspheric surface (the vertical distance between the point x from the optical axis on the aspheric surface and a tangent plane tangent to a vertex on the optical axis of the aspheric surface).

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. Herein P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number of inflexion points | Inflexion point position 1 | Inflexion point position 2 |
|---|---|---|---|
| P1R1 | 1 | 1.685 | / |
| P1R2 | 0 | / | / |
| P2R1 | 2 | 0.805 | 2.525 |
| P2R2 | 1 | 1.095 | / |
| P3R1 | 2 | 0.755 | 2.355 |
| P3R2 | 2 | 0.435 | 1.735 |

TABLE 3-continued

| | Number of inflexion points | Inflexion point position 1 | Inflexion point position 2 |
|---|---|---|---|
| P4R1 | 1 | 2.315 | / |
| P4R2 | 1 | 2.275 | / |
| P5R1 | 0 | / | / |
| P5R2 | 1 | 1.275 | / |
| P6R1 | 1 | 4.105 | / |
| P6R2 | 2 | 1.795 | 6.575 |

TABLE 4

| | Number of arrest points | Arrest point position 1 | Arrest point position 2 |
|---|---|---|---|
| P1R1 | 1 | 2.465 | / |
| P1R2 | 0 | / | / |
| P2R1 | 1 | 1.495 | / |
| P2R2 | 0 | / | / |
| P3R1 | 1 | 1.555 | / |
| P3R2 | 2 | 0.825 | 2.275 |
| P4R1 | 0 | / | / |
| P4R2 | 0 | / | / |
| P5R1 | 0 | / | / |
| P5R2 | 1 | 1.885 | / |
| P6R1 | 0 | / | / |
| P6R2 | 1 | 4.065 | / |

Figure 2:
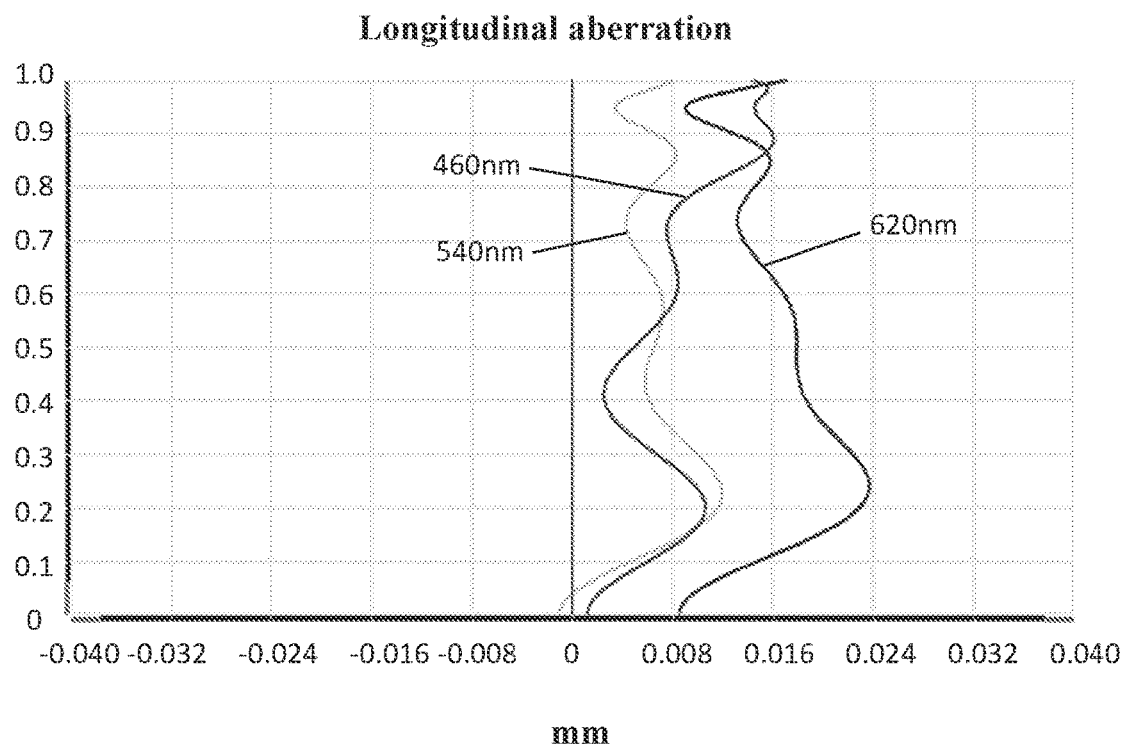
FIG. 2 is a schematic diagram of a longitudinal aberration of the camera optical lens shown in FIG. 1.
Figure 3:
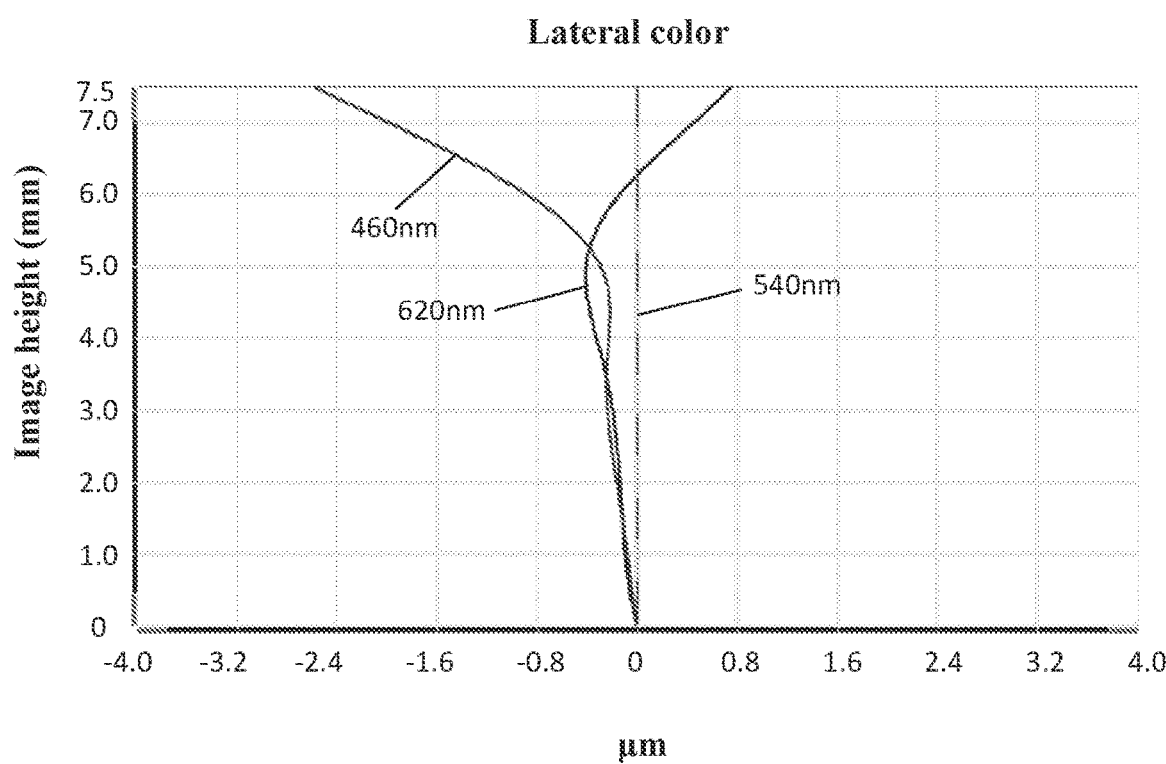
FIG. 3 shows a schematic diagram of a lateral color of the camera optical lens shown in FIG. 1.
Figure 4:
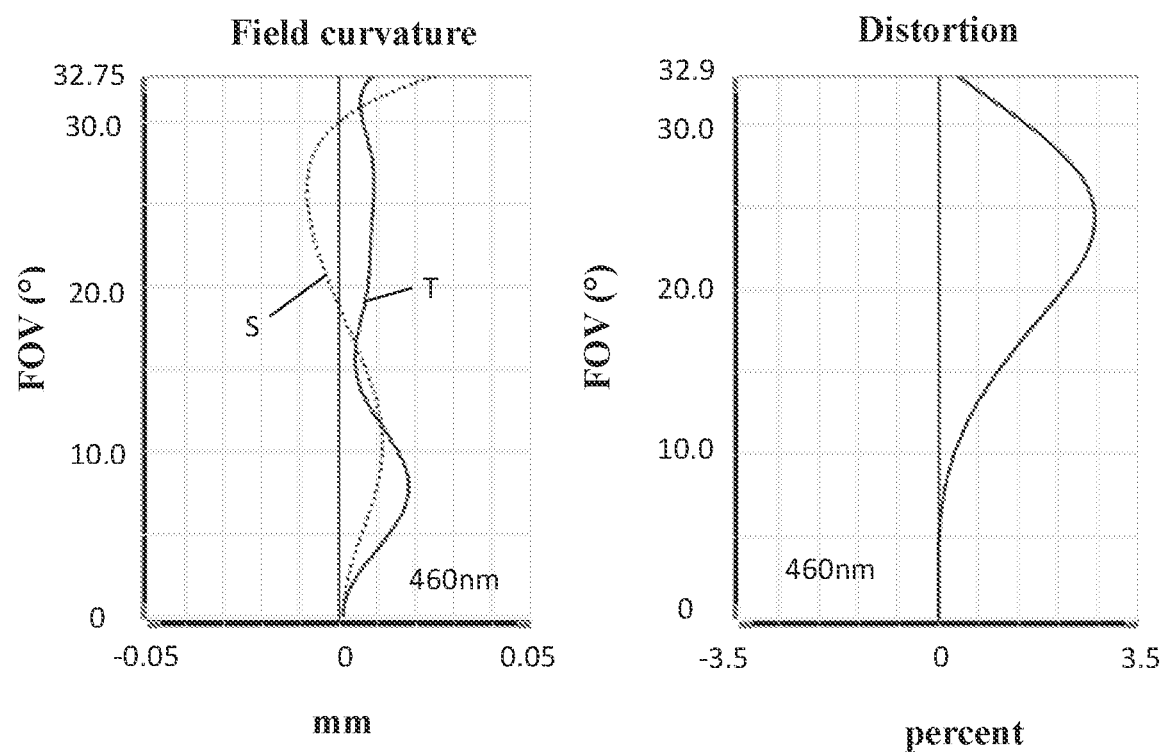
FIG. 4 shows a schematic diagram of a field curvature and a distortion of the camera optical lens shown in FIG. 1.

FIG. 2 and FIG. 3 illustrate a longitudinal aberration and a lateral color with wavelengths of 460 nm, 540 nm and 620 nm after passing the camera optical lens 10 according to Embodiment 1, respectively. FIG. 4 illustrates a field curvature and a distortion with a wavelength of 460 nm after passing the camera optical lens 10 according to Embodiment 1. A field curvature S in FIG. 4 is a field curvature in a sagittal direction, and T is a field curvature in a tangential direction.

Table 17 in the following shows various values of Embodiments 1, 2, 3, and 4, and also values corresponding to parameters which are specified in the above conditions.

As shown in Table 17, Embodiment 1 satisfies the above conditions.

In the embodiment, an entrance pupil diameter (ENPD) of the camera optical lens 10 is 5.200 mm, an image height IH of 1.0H is 7.500 mm, an FOV (field of view) in a diagonal direction is 65.50°. Thus, the camera optical lens can meet the design requirements of a large aperture, a wide angle and ultra-thin, and its on-axis and off-axis chromatic aberrations are fully corrected, thereby achieving excellent optical characteristics.

Embodiment 2

Figure 5:
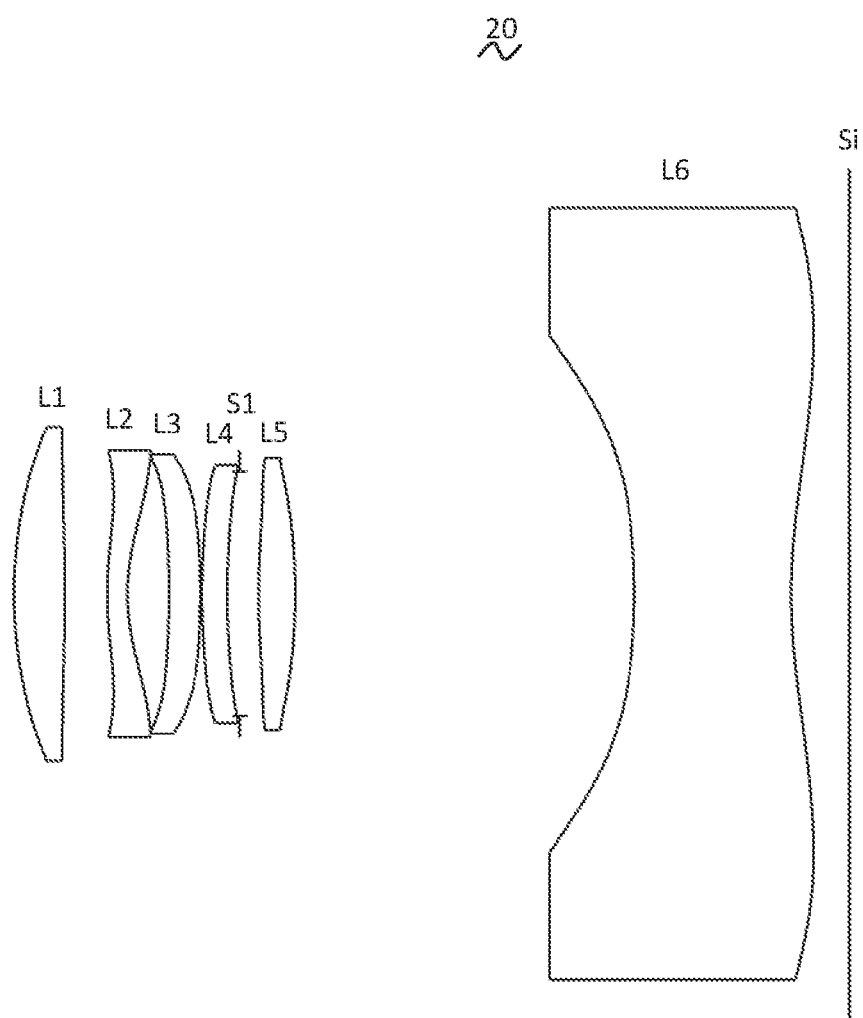
FIG. 5 shows a schematic diagram of a structure of a camera optical lens according to Embodiment 2 of the present disclosure.

FIG. 5 shows a schematic diagram of a structure of a camera optical lens according to Embodiment 2 of the present disclosure. Embodiment 2 is basically the same as Embodiment 1 and involves symbols having the same meanings as Embodiment 1, and only differences therebetween will be described in the following.

In the embodiment, the camera optical lens 20 includes six lenses. Specifically, the camera optical lens 20 includes, from an object side to an image side: a first lens L1, a second lens L2, a third lens L3, a fourth lens L4, an aperture S1, a fifth lens L5, a sixth lens L6 and an image surface Si. The fourth lens L4 has a positive refractive power.

Table 5 and Table 6 show design data of a camera optical lens 20 in Embodiment 2 of the present disclosure.

TABLE 5

| | R | d | nd | vd |
|---|---|---|---|---|
| S1 | ∞ | d0= −3.796 | | |
| R1 | 8.367 | d1= 0.810 | nd1 1.5444 | v1 55.82 |
| R2 | −28.635 | d2= 0.778 | | |
| R3 | 8.462 | d3= 0.350 | nd2 1.6400 | v2 23.54 |
| R4 | 4.207 | d4= 0.669 | | |
| R5 | −17.520 | d5= 0.529 | nd3 1.5444 | v3 55.82 |
| R6 | −17.823 | d6= 0.030 | | |
| R7 | 10.600 | d7= 0.430 | nd4 1.6400 | v4 23.54 |
| R8 | 10.831 | d8= 0.648 | | |
| R9 | 11.444 | d9= 0.705 | nd5 1.5444 | v5 55.82 |
| R10 | −12.215 | d10= 5.743 | | |

TABLE 5-continued

| | R | d | nd | vd |
|---|---|---|---|---|
| R11 | −12.822 | d11= 2.810 | nd6 1.5444 | v6 55.82 |
| R12 | 10.439 | d12= 1.098 | | |

Table 6 shows aspherical surface data of each lens of the camera optical lens 20 in Embodiment 2 of the present disclosure.

TABLE 6

| | Conic coefficient k | Aspheric surface coefficients | | | | |
|---|---|---|---|---|---|---|
| | | A4 | A6 | A8 | A10 | A12 |
| R1 | 3.3498E+00 | −6.6710E−04 | 1.2725E−05 | −2.2372E−05 | 8.1951E−06 | −1.7006E−06 |
| R2 | 1.0895E+01 | 2.1294E−03 | −3.2592E−04 | 5.6443E−05 | −6.8022E−06 | 2.8344E−07 |
| R3 | −5.3608E+00 | −1.0725E−02 | −5.6538E−04 | 1.8276E−04 | 1.9859E−05 | −2.3723E−05 |
| R4 | −3.4264E+00 | −7.2424E−03 | −6.6756E−04 | 4.9557E−05 | −1.1197E−04 | −4.6612E−05 |
| R5 | 4.3038E+01 | 5.3323E−03 | −4.6418E−03 | 1.9763E−03 | −6.9256E−04 | 2.2343E−04 |
| R6 | 3.1050E+01 | −1.7879E−03 | −7.3893E−03 | 4.6061E−03 | −1.4753E−03 | 2.4178E−04 |
| R7 | −2.1442E+01 | −7.0209E−03 | 1.8516E−03 | 4.3365E−04 | −9.2862E−06 | −1.3180E−04 |
| R8 | 4.3656E−01 | −1.3962E−02 | 7.2118E−03 | −3.2251E−03 | 1.3748E−03 | −4.1922E−04 |
| R9 | −4.6214E−01 | −9.6907E−03 | 1.2313E−03 | −2.1555E−04 | −1.9352E−05 | 4.3375E−05 |
| R10 | 1.1742E+01 | −1.3122E−03 | 4.8276E−04 | −5.3133E−04 | 3.2695E−04 | −1.1785E−04 |
| R11 | −1.0275E+01 | −4.0446E−03 | 1.0345E−04 | −1.3223E−06 | −9.7465E−08 | 1.3358E−08 |
| R12 | 3.5606E−01 | −2.6229E−03 | 7.7278E−05 | −1.8408E−06 | 1.7894E−08 | 7.6278E−11 |

| | Conic coefficient k | Aspheric surface coefficients | | | |
|---|---|---|---|---|---|
| | | A14 | A16 | A18 | A20 |
| R1 | 3.3498E+00 | 2.0639E−07 | −1.4334E−08 | 5.3312E−10 | −8.1959E−12 |
| R2 | 1.0895E+01 | 5.4582E−08 | −9.0473E−09 | 5.3070E−10 | −1.1421E−11 |
| R3 | −5.3608E+00 | 7.3251E−06 | −1.1275E−06 | 8.6188E−08 | −2.5918E−09 |
| R4 | −3.4264E+00 | 7.2132E−06 | −6.7684E−08 | −9.0903E−08 | 6.6136E−09 |
| R5 | 4.3038E+01 | −6.3501E−05 | 1.2130E−05 | −1.2613E−06 | 5.3486E−08 |
| R6 | 3.1050E+01 | −1.5506E−05 | −7.5626E−07 | 1.5847E−07 | −6.1239E−09 |
| R7 | −2.1442E+01 | 5.0875E−05 | −8.4920E−06 | 6.9006E−07 | −2.2490E−08 |
| R8 | 4.3656E−01 | 8.0974E−05 | −9.2774E−06 | 5.7642E−07 | −1.5188E−08 |
| R9 | −4.6214E−01 | −1.5876E−05 | 2.9085E−06 | −2.6604E−07 | 9.6133E−09 |
| R10 | 1.1742E+01 | 2.7217E−05 | −3.8464E−06 | 3.0697E−07 | −1.0529E−08 |
| R11 | −1.0275E+01 | −4.5155E−10 | 4.9285E−12 | 0.0000E+00 | 0.0000E+00 |
| R12 | 3.5606E−01 | −2.5314E−12 | 1.4887E−14 | −2.8283E−17 | 0.0000E+00 |

Table 7 and table 8 show design data of inflexion points and arrest points of each lens of the camera optical lens 20 lens according to Embodiment 2 of the present disclosure.

TABLE 7

| | Number of inflexion points | Inflexion point position 1 | Inflexion point position 2 |
|---|---|---|---|
| P1R1 | 0 | / | / |
| P1R2 | 1 | 1.755 | / |
| P2R1 | 1 | 0.905 | / |
| P2R2 | 1 | 1.335 | / |
| P3R1 | 0 | / | / |
| P3R2 | 0 | / | / |
| P4R1 | 0 | / | / |
| P4R2 | 0 | / | / |
| P5R1 | 2 | 0.995 | 1.885 |
| P5R2 | 1 | 2.025 | / |
| P6R1 | 1 | 4.225 | / |
| P6R2 | 2 | 2.145 | 6.615 |

TABLE 8

| | Number of arrest points | Arrest point position 1 |
|---|---|---|
| P1R1 | 0 | / |
| P1R2 | 0 | / |
| P2R1 | 1 | 1.585 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 1 | 4.395 |

Figure 6:
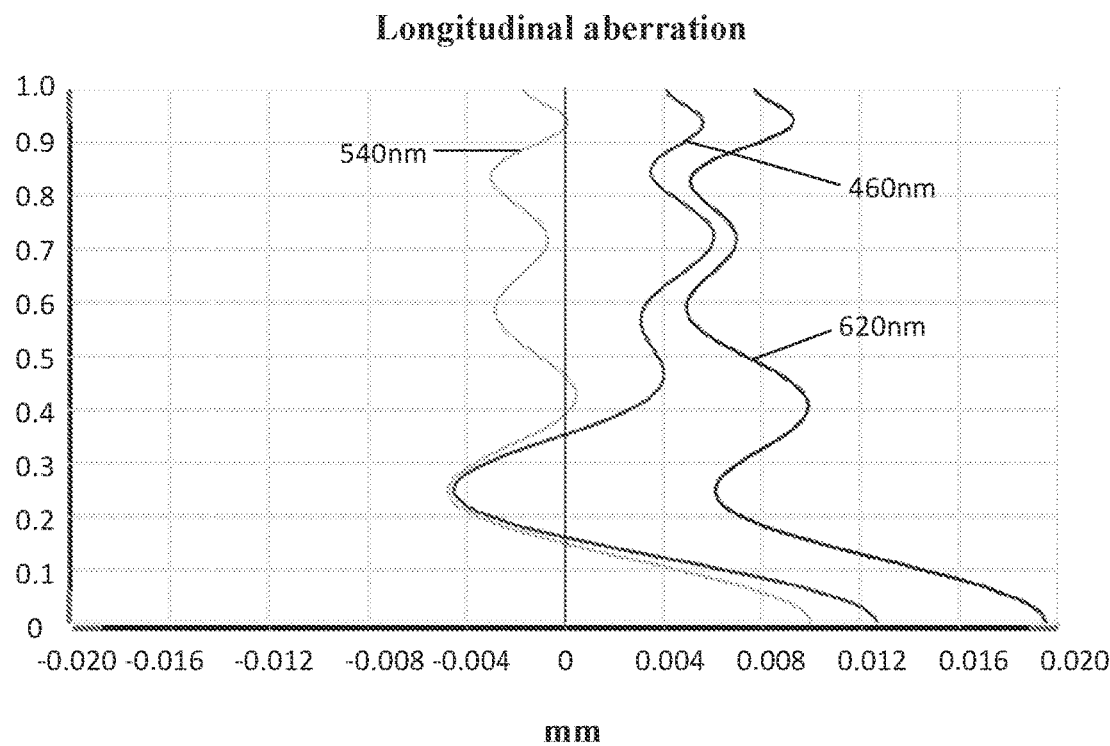
FIG. 6 shows a schematic diagram of a longitudinal aberration of the camera optical lens shown in FIG. 5.
Figure 7:
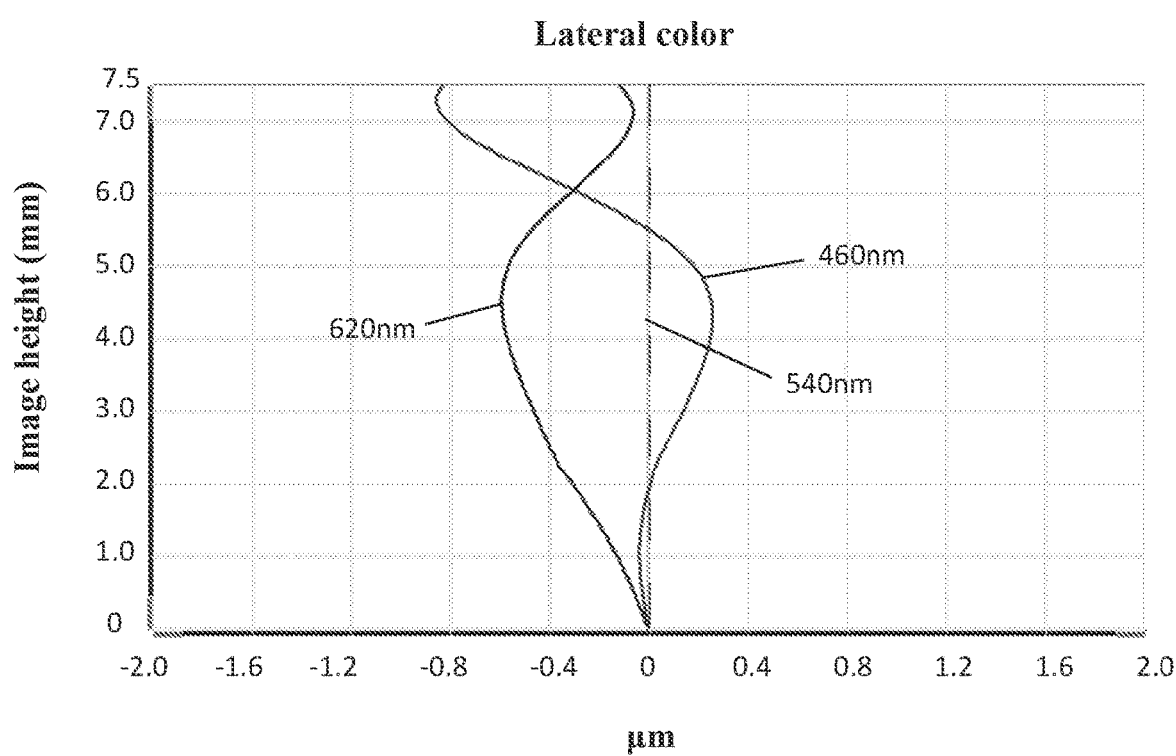
FIG. 7 shows a schematic diagram of a lateral color of the camera optical lens shown in FIG. 5.
Figure 8:
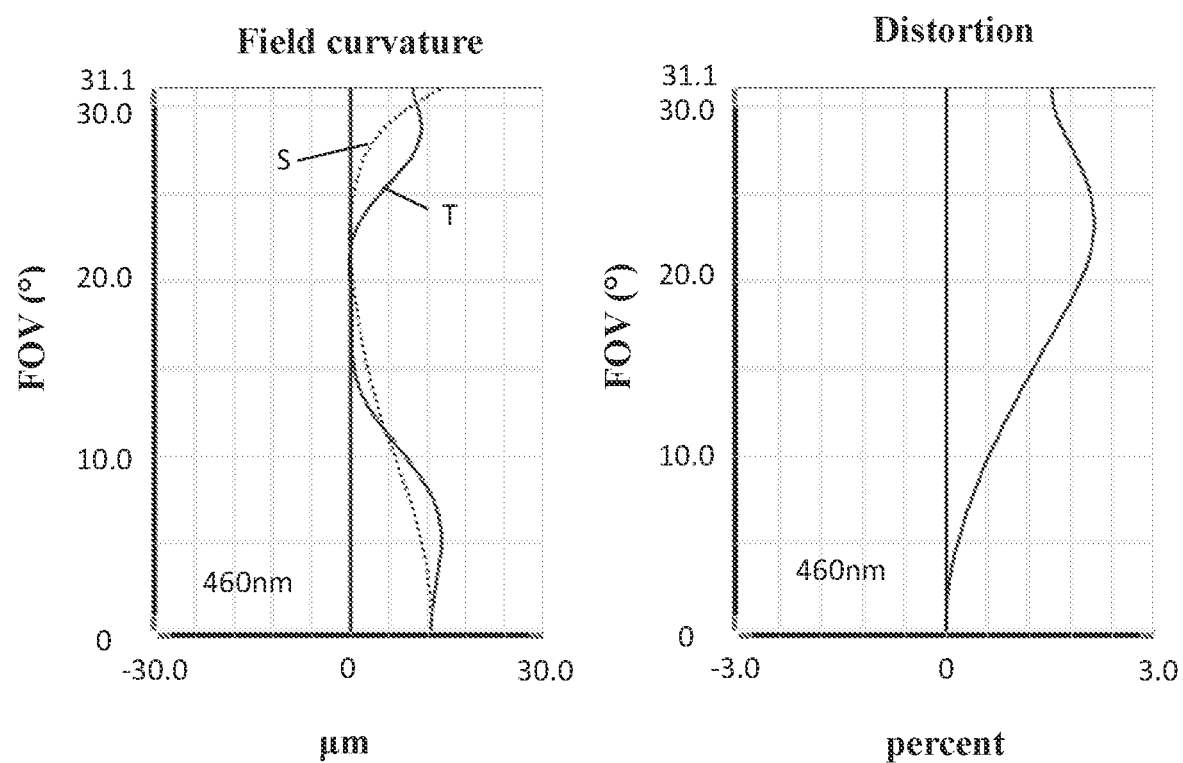
FIG. 8 shows a schematic diagram of a field curvature and a distortion of the camera optical lens shown in FIG. 5.

FIG. 6 and FIG. 7 illustrate a longitudinal aberration and a lateral color with wavelengths of 460 nm, 540 nm and 620 nm after passing the camera optical lens 20 according to Embodiment 2, respectively. FIG. 8 illustrates a field curvature and a distortion with a wavelength of 460 nm after passing the camera optical lens 20 according to Embodiment 2.

As shown in Table 17, Embodiment 2 satisfies the above conditions.

In the embodiment, an entrance pupil diameter (ENPD) of the camera optical lens 20 is 5.200 mm, an image height IH of 1.0H is 7.500 mm, an FOV (field of view) in the diagonal direction is 62.20°. Thus, the camera optical lens can meet the design requirements of a large aperture, a wide angle and ultra-thin, and its on-axis and off-axis chromatic aberrations are fully corrected, thereby achieving excellent optical characteristics.

Embodiment 3

Figure 9:
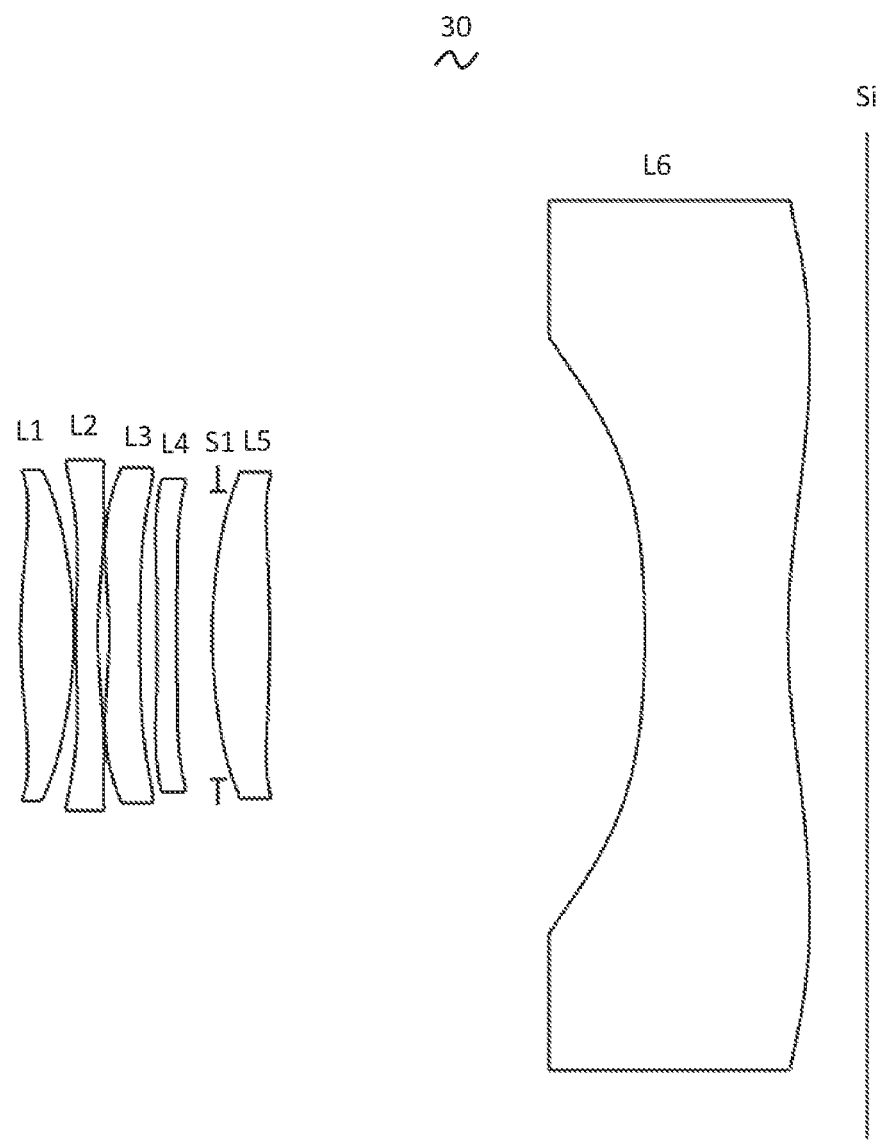
FIG. 9 shows a schematic diagram of a structure of a camera optical lens according to Embodiment 3 of the present disclosure.

FIG. 9 shows a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

In the embodiment, the camera optical lens 30 includes six lenses. Specifically, the camera optical lens 30 includes, from an object side to an image side: a first lens L1, a second lens L2, a third lens L3, a fourth lens L4, an aperture S1, a fifth lens L5, a sixth lens L6, and an image surface Si. An object-side surface of the fourth lens L4 is concave in a paraxial region.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −3.263 | | | |
| R1 | 9.245 | d1= | 0.882 | nd1 | 1.5444 | v1 55.82 |
| R2 | −5.950 | d2= | 0.030 | | | |
| R3 | 13.458 | d3= | 0.365 | nd2 | 1.6400 | v2 23.54 |
| R4 | 7.234 | d4= | 0.187 | | | |
| R5 | −6.008 | d5= | 0.510 | nd3 | 1.5444 | v3 55.82 |
| R6 | −1207.698 | d6= | 0.281 | | | |
| R7 | −147.232 | d7= | 0.324 | nd4 | 1.6400 | v4 23.54 |
| R8 | 24.920 | d8= | 0.587 | | | |
| R9 | 6.953 | d9= | 0.950 | nd5 | 1.5444 | v5 55.82 |
| R10 | −20.511 | d10= | 6.200 | | | |
| R11 | −16.920 | d11= | 2.368 | nd6 | 1.5444 | v6 55.82 |
| R12 | 9.972 | d12= | 1.306 | | | |

Table 10 shows aspherical surface data of each lens of the camera optical lens 30 in Embodiment 3 of the present disclosure.

TABLE 10

| | Conic coefficient | Aspherical surface coefficients | | | | |
|---|---|---|---|---|---|---|
| | k | A4 | A6 | A8 | A10 | A12 |
| R1 | −6.4001E+00 | −3.5574E−03 | −2.4809E−04 | −1.2552E−04 | 2.6197E−05 | 4.1476E−06 |
| R2 | −1.9552E+00 | 5.0884E−03 | −3.8071E−04 | −2.1410E−04 | 5.6209E−05 | −7.7899E−06 |
| R3 | −9.9000E+01 | −8.5688E−03 | −2.2825E−04 | 2.1393E−03 | −9.5743E−04 | 2.4655E−04 |
| R4 | −1.9422E+01 | −6.9784E−03 | −2.9506E−03 | 2.2026E−03 | −8.9390E−04 | 2.3996E−04 |
| R5 | −1.0581E+00 | 3.6713E−02 | −9.8227E−03 | 2.8193E−03 | −6.0581E−04 | 1.0959E−04 |
| R6 | −1.0500E+02 | 1.5815E−02 | −4.7270E−03 | 1.2059E−03 | −2.0640E−04 | 2.4855E−05 |
| R7 | −9.2485E+01 | −1.7411E−02 | 1.1432E−02 | −3.4633E−03 | 7.0205E−04 | −8.9953E−05 |
| R8 | −3.4351E+01 | −2.0469E−02 | 1.1930E−02 | −3.4514E−03 | 6.9658E−04 | −9.4953E−05 |
| R9 | 3.7447E+00 | −9.6295E−03 | 2.4079E−03 | −4.6264E−04 | 7.6337E−05 | −9.2167E−06 |
| R10 | 1.9716E+01 | 1.5377E−03 | 1.2046E−04 | 1.1981E−04 | −2.3543E−05 | 3.4615E−06 |
| R11 | 4.8636E+00 | −3.5799E−03 | 1.1253E−04 | −4.4452E−06 | 2.7116E−07 | −9.7174E−09 |
| R12 | −6.7531E+00 | −2.1525E−03 | 1.0434E−04 | −4.9954E−06 | 2.0226E−07 | −6.5265E−09 |

| | Conic coefficient | Aspherical surface coefficients | | | |
|---|---|---|---|---|---|
| | k | A14 | A16 | A18 | A20 |
| R1 | −6.4001E+00 | −3.4002E−06 | 7.1890E−07 | −6.9008E−08 | 2.5927E−09 |
| R2 | −1.9552E+00 | 2.9815E−07 | 8.8736E−08 | −1.4564E−08 | 6.9566E−10 |
| R3 | −9.9000E+01 | −3.6352E−05 | 2.9710E−06 | −1.1813E−07 | 1.4694E−09 |
| R4 | −1.9422E+01 | −4.0480E−05 | 4.0997E−06 | −2.2763E−07 | 5.3317E−09 |
| R5 | −1.0581E+00 | −1.7844E−05 | 2.1905E−06 | −1.6122E−07 | 5.1595E−09 |
| R6 | −1.0500E+02 | −2.2965E−06 | 1.0643E−07 | 0.0000E+00 | 0.0000E+00 |
| R7 | −9.2485E+01 | 6.3927E−06 | −1.8765E−07 | 0.0000E+00 | 0.0000E+00 |

TABLE 10-continued

| | | | | |
|---|---|---|---|---|
| R8 | −3.4351E+01 | 7.7224E−06 | −2.7344E−07 | 0.0000E+00 | 0.0000E+00 |
| R9 | 3.7447E+00 | 7.2787E−07 | −3.1844E−08 | 3.5195E−10 | −2.6705E−20 |
| R10 | 1.9716E+01 | −2.3793E−07 | 4.6188E−09 | 0.0000E+00 | 0.0000E+00 |
| R11 | 4.8636E+00 | 2.5625E−10 | −3.4915E−12 | 0.0000E+00 | 0.0000E+00 |
| R12 | −6.7531E+00 | 1.5478E−10 | −2.4595E−12 | 2.3185E−14 | −9.7287E−17 |

Table 11 and Table 12 show design data inflexion points and arrest points of the respective lenses in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 1.235 | / | / |
| P1R2 | 0 | / | / | / |
| P2R1 | 3 | 0.685 | 2.405 | 2.705 |
| P2R2 | 2 | 0.945 | 2.195 | / |
| P3R1 | 1 | 0.725 | / | / |
| P3R2 | 2 | 0.075 | 2.195 | / |
| P4R1 | 1 | 1.075 | / | / |
| P4R2 | 2 | 0.485 | 0.955 | / |
| P5R1 | 0 | / | / | / |
| P5R2 | 1 | 1.265 | / | / |
| P6R1 | 1 | 4.325 | / | / |
| P6R2 | 2 | 2.105 | 6.555 | / |

TABLE 12

| | Number of arrest points | Arrest point position 1 | Arrest point position 2 |
|---|---|---|---|
| P1R1 | 1 | 1.975 | / |
| P1R2 | 0 | / | / |
| P2R1 | 1 | 1.225 | / |
| P2R2 | 2 | 1.885 | 2.455 |
| P3R1 | 1 | 1.385 | / |
| P3R2 | 1 | 0.115 | / |
| P4R1 | 1 | 1.535 | / |
| P4R2 | 0 | / | / |
| P5R1 | 0 | / | / |
| P5R2 | 1 | 1.885 | / |
| P6R1 | 0 | / | / |
| P6R2 | 1 | 4.375 | / |

Figure 10:
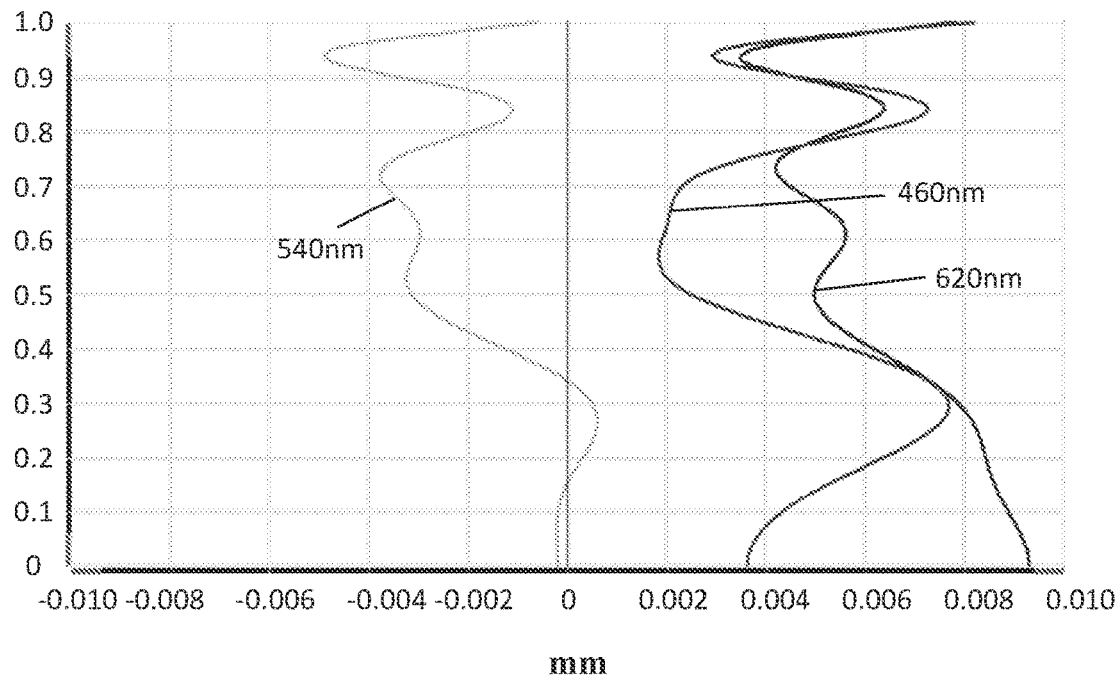
FIG. 10 shows a schematic diagram of a longitudinal aberration of the camera optical lens shown in FIG. 9.
Figure 11:
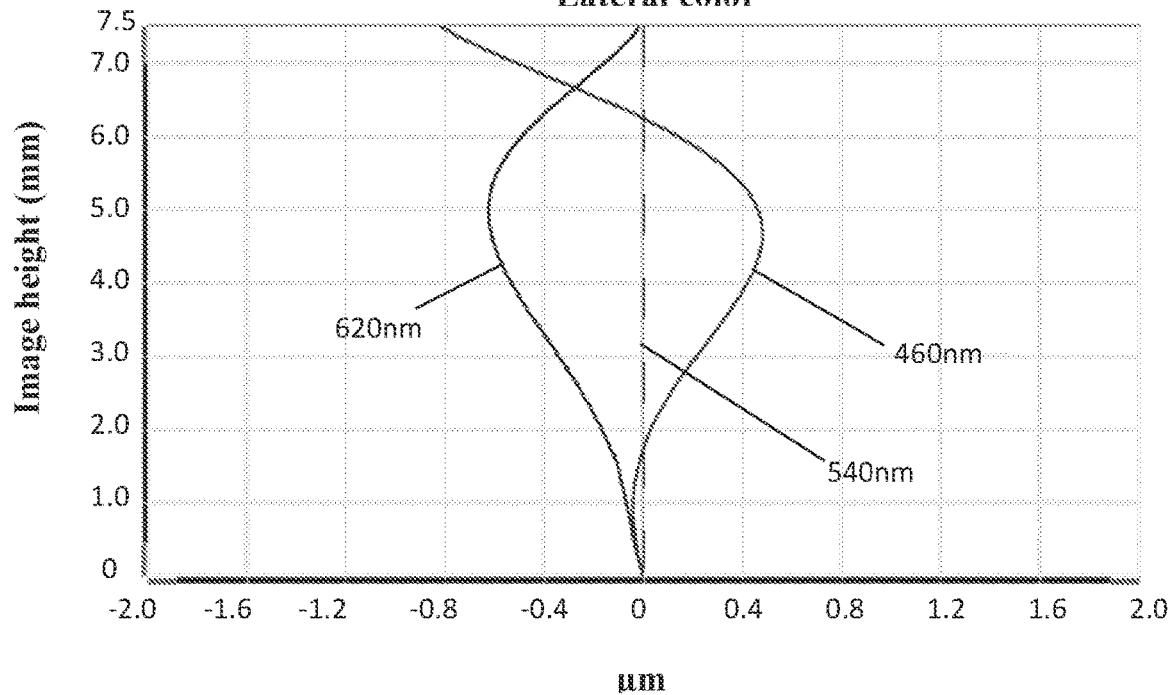
FIG. 11 shows a schematic diagram of a lateral color of the camera optical lens shown in FIG. 9.
Figure 12:
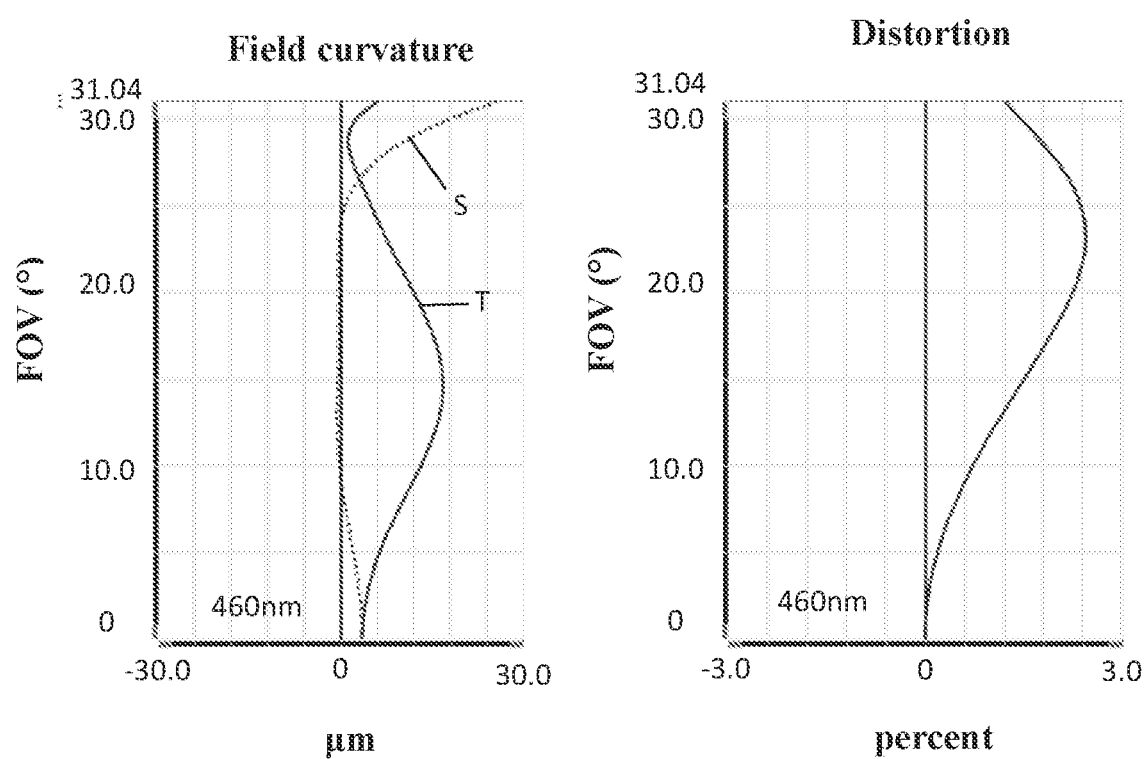
FIG. 12 shows a schematic diagram of a field curvature and a distortion of the camera optical lens shown in FIG. 9.

FIG. 10 and FIG. 11 illustrate a longitudinal aberration and a lateral color of light with wavelengths of 460 nm, 540 nm and 620 nm after passing the camera optical lens 30 according to Embodiment 3. FIG. 12 illustrates a field curvature and a distortion of light with a wavelength of 460 nm after passing the camera optical lens 30 according to Embodiment 3.

Table 17 in the following shows various values of Embodiment 3 and values corresponding to parameters which are specified in the above conditions. Obviously, Embodiment 3 satisfies the above conditions.

In the embodiment, an entrance pupil diameter (ENPD) of the camera optical lens 30 is 5.200 mm, an image height IH of 1.0H is 7.500 mm, an FOV (field of view) in the diagonal direction is 62.08°. The camera optical lens can meet the design requirements of a large aperture, a wide angle and ultra-thin, and its on-axis and off-axis chromatic aberrations are fully corrected, thereby achieving excellent optical characteristics.

Embodiment 4

Figure 13:
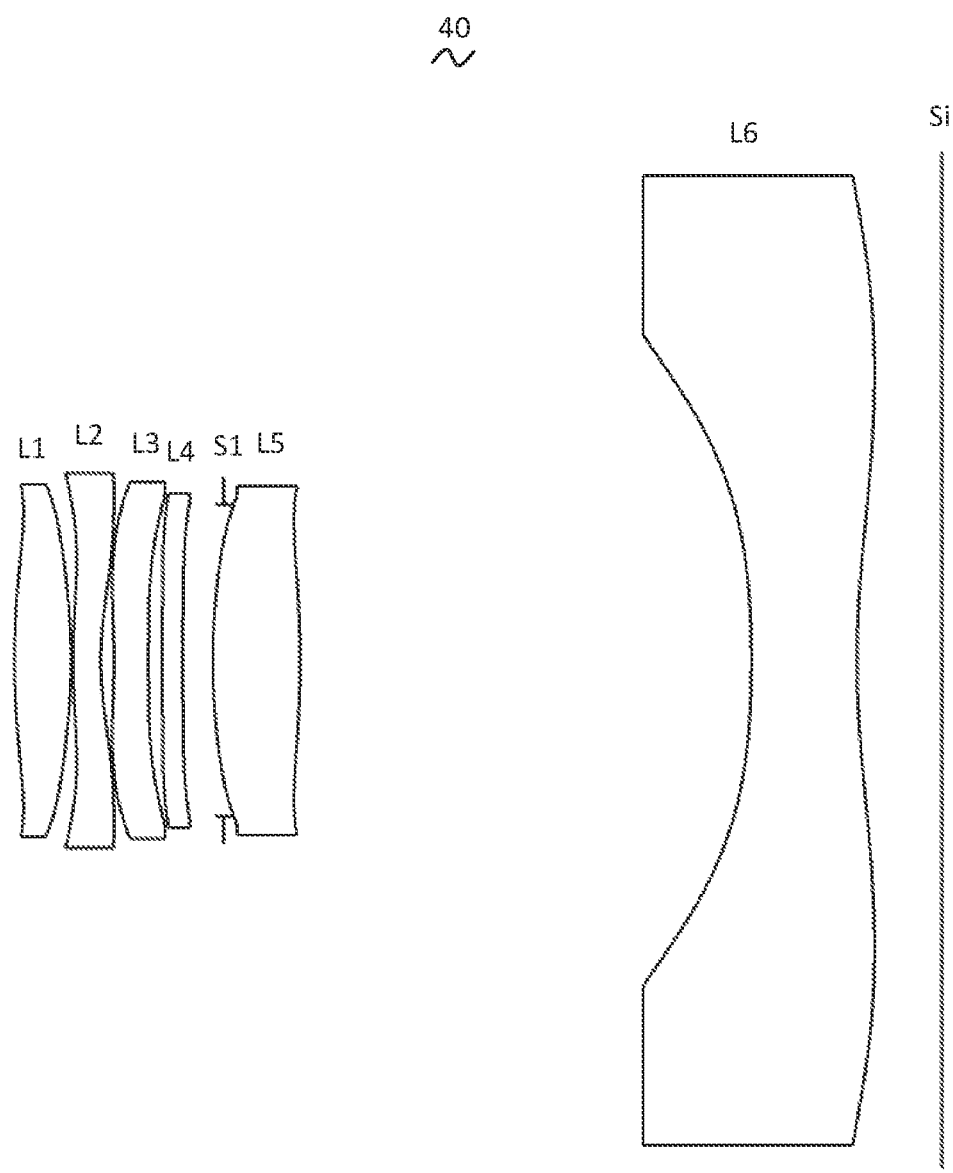
FIG. 13 shows a schematic diagram of a structure of a camera optical lens according to Embodiment 4 of the present disclosure.

FIG. 13 shows a schematic diagram of a structure of a camera optical lens according to Embodiment 4 of the present disclosure. Embodiment 4 is basically the same as Embodiment 1 and involves symbols having the same meanings as Embodiment 1, and only differences therebetween will be described in the following.

In the embodiment, the camera optical lens 40 includes six lenses. Specifically, the camera optical lens 40 includes, from an object side to an image side: a first lens L1, a second lens L2, a third lens L3, a fourth lens L4, an aperture S1, a fifth lens L5, a sixth lens L6, and an image surface Si.

Table 13 and Table 14 show design data of a camera optical lens 40 in Embodiment 3 of the present disclosure.

TABLE 13

| | R | d | | nd | | vd |
|---|---|---|---|---|---|---|
| S1 | ∞ | d0= | −3.299 | | | |
| R1 | 10.439 | d1= | 0.890 | nd1 | 1.5444 | v1 55.82 |
| R2 | −8.027 | d2= | 0.030 | | | |
| R3 | 8.682 | d3= | 0.441 | nd2 | 1.6400 | v2 23.54 |
| R4 | 4.844 | d4= | 0.206 | | | |
| R5 | −9.074 | d5= | 0.542 | nd3 | 1.5444 | v3 55.82 |
| R6 | −1823.907 | d6= | 0.218 | | | |
| R7 | 36.174 | d7= | 0.320 | nd4 | 1.6400 | v4 23.54 |
| R8 | 21.373 | d8= | 0.477 | | | |
| R9 | 9.219 | d9= | 1.372 | nd5 | 1.5444 | v5 55.82 |
| R10 | −13.199 | d10= | 7.105 | | | |
| R11 | −13.742 | d11= | 1.658 | nd6 | 1.5444 | v6 55.82 |
| R12 | 12.003 | d12= | 1.340 | | | |

Table 14 shows aspherical surface data of each lens of the camera optical lens 40 in Embodiment 4 of the present disclosure.

TABLE 14

| | Conic coefficient | Aspheric surface coefficients | | | | |
|---|---|---|---|---|---|---|
| | k | A4 | A6 | A8 | A10 | A12 |
| R1 | 2.7587E+00 | −2.6926E−03 | −4.5843E−05 | −2.0137E−04 | 7.6544E−05 | −1.5455E−05 |
| R2 | −3.2503E+00 | 6.6547E−03 | −1.4639E−03 | 3.1547E−04 | −1.3629E−04 | 3.8104E−05 |
| R3 | −3.1335E+01 | −9.6287E−03 | −1.6800E−03 | 1.9700E−03 | −9.9888E−04 | 2.9047E−04 |
| R4 | −9.7090E+00 | −7.5640E−03 | −2.2718E−03 | 2.2215E−03 | −1.1296E−03 | 3.5020E−04 |
| R5 | 2.6204E+00 | 3.4444E−02 | −9.8220E−03 | 3.1056E−03 | −8.2513E−04 | 1.7326E−04 |
| R6 | −1.0500E+02 | 1.8615E−02 | −4.8860E−03 | 9.9566E−04 | −5.1951E−05 | −2.2362E−05 |
| R7 | −9.9000E+01 | −1.6511E−02 | 9.8276E−03 | −3.0454E−03 | 6.8324E−04 | −1.0575E−04 |

TABLE 14-continued

| | | | | | |
|---|---|---|---|---|---|
| R8 | −9.8966E+01 | −1.8605E−02 | 1.0348E−02 | −2.9519E−03 | 6.0613E−04 | −8.7176E−05 |
| R9 | 6.3285E+00 | −5.1690E−03 | 2.1178E−03 | −4.4668E−04 | 7.6122E−05 | −9.3427E−06 |
| R10 | −1.1999E+01 | 1.6365E−03 | 1.3064E−04 | 7.3858E−05 | −1.2123E−05 | 1.6570E−06 |
| R11 | −4.7854E+00 | −3.5902E−03 | 1.0780E−04 | −3.0086E−06 | 1.2904E−07 | −3.3070E−09 |
| R12 | −6.4119E+00 | −2.1830E−03 | 1.1057E−04 | −5.4716E−06 | 2.2951E−07 | −7.3346E−09 |

| | Conic coefficient | Aspheric surface coefficients | | | |
|---|---|---|---|---|---|
| | k | A14 | A16 | A18 | A20 |
| R1 | 2.7587E+00 | 8.7503E−07 | 1.8123E−07 | −3.2396E−08 | 1.5435E−09 |
| R2 | −3.2503E+00 | −6.6553E−06 | 7.4471E−07 | −5.0282E−08 | 1.5687E−09 |
| R3 | −3.1335E+01 | −5.0164E−05 | 5.1325E−06 | −2.8877E−07 | 6.9013E−09 |
| R4 | −9.7090E+00 | −6.6015E−05 | 7.4188E−06 | −4.5729E−07 | 1.1880E−08 |
| R5 | 2.6204E+00 | −2.6991E−05 | 2.8051E−06 | −1.6746E−07 | 4.2514E−09 |
| R6 | −1.0500E+02 | 4.2186E−06 | −2.3520E−07 | 1.6576E−09 | −1.4610E−19 |
| R7 | −9.9000E+01 | 9.5521E−06 | −3.6583E−07 | −1.0375E−10 | −2.2756E−20 |
| R8 | −9.8966E+01 | 7.5660E−06 | −2.9044E−07 | 4.4566E−10 | 4.2753E−21 |
| R9 | 6.3285E+00 | 7.2938E−07 | −3.1170E−08 | 4.2076E−10 | 6.0994E−12 |
| R10 | 1.1999E+01 | −1.1103E−07 | 2.3112E−09 | 0.0000E+00 | 0.0000E+00 |
| R11 | −4.7854E+00 | 6.0373E−11 | −6.7828E−13 | 0.0000E+00 | 0.0000E+00 |
| R12 | −6.4119E+00 | 1.6443E−10 | −2.4000E−12 | 2.0442E−14 | −7.6956E−17 |

Table 15 and Table 16 show design data of inflexion points and arrest points of each lens of the camera optical lens 40 lens according to Embodiment 4 of the present disclosure.

TABLE 15

| | Number of inflexion points | Inflexion point position 1 | Inflexion point position 2 |
|---|---|---|---|
| P1R1 | 1 | 1.445 | / |
| P1R2 | 1 | 2.785 | / |
| P2R1 | 1 | 0.825 | / |
| P2R2 | 1 | 1.105 | / |
| P3R1 | 1 | 0.585 | / |
| P3R2 | 2 | 0.055 | 2.395 |
| P4R1 | 2 | 0.425 | 1.005 |
| P4R2 | 2 | 0.545 | 0.995 |
| P5R1 | 0 | / | / |
| P5R2 | 1 | 1.345 | / |
| P6R1 | 1 | 4.485 | / |
| P6R2 | 2 | 2.015 | 6.655 |

TABLE 16

| | Number of arrest points | Arrest point position 1 |
|---|---|---|
| P1R1 | 1 | 2.195 |
| P1R2 | 1 | 3.005 |
| P2R1 | 1 | 1.495 |
| P2R2 | 1 | 2.365 |
| P3R1 | 1 | 1.115 |
| P3R2 | 1 | 0.085 |
| P4R1 | 0 | / |
| P4R2 | 0 | / |
| P5R1 | 0 | / |
| P5R2 | 1 | 2.065 |
| P6R1 | 0 | / |
| P6R2 | 1 | 4.245 |

Figure 14:
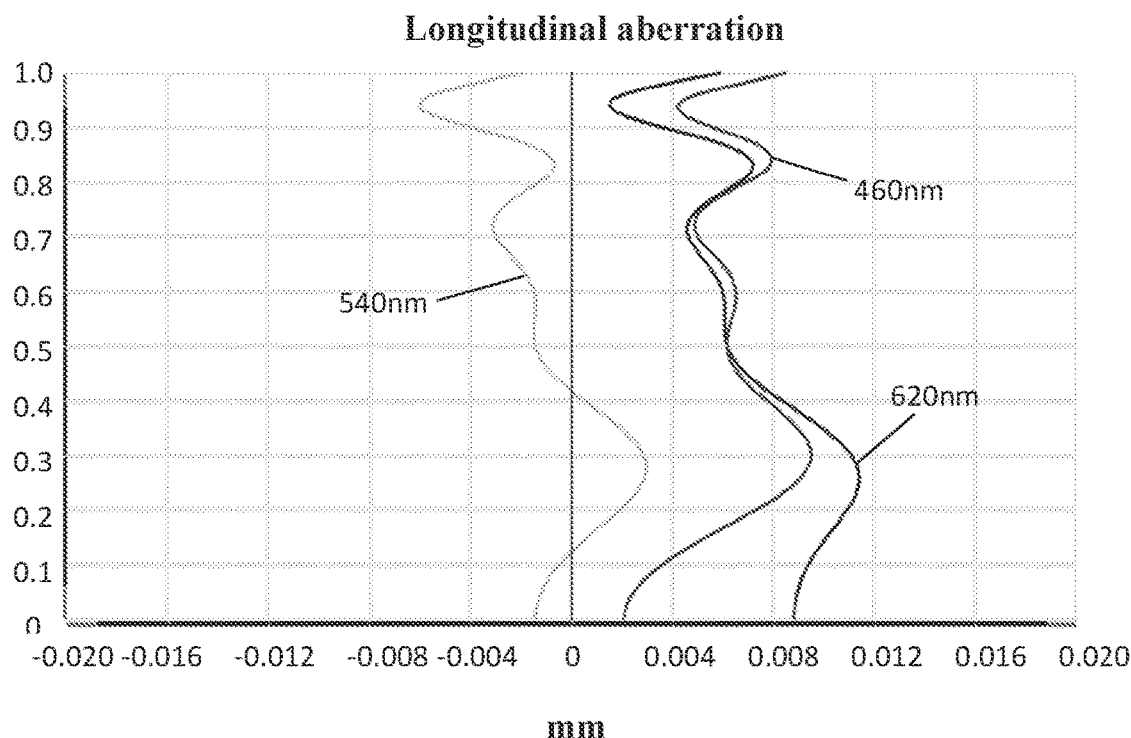
FIG. 14 shows a schematic diagram of a longitudinal aberration of the camera optical lens shown in FIG. 13.
Figure 15:
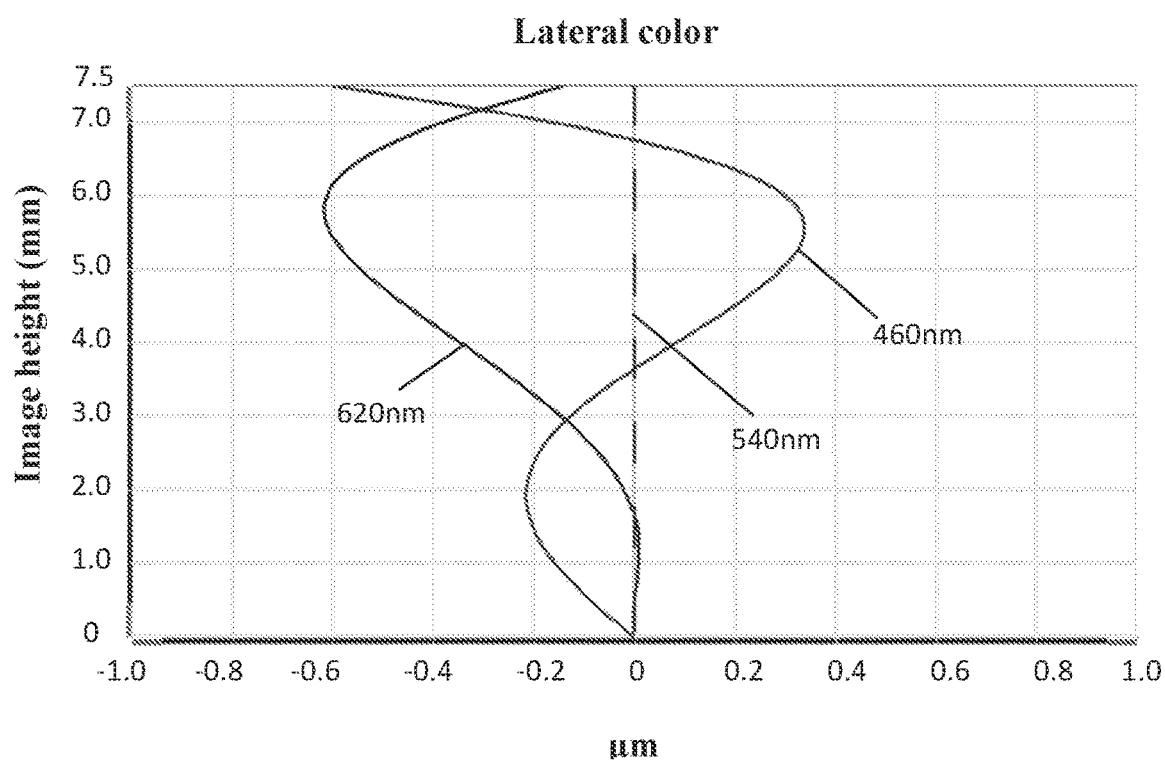
FIG. 15 shows a schematic diagram of a lateral color of the camera optical lens shown in FIG. 13.
Figure 16:
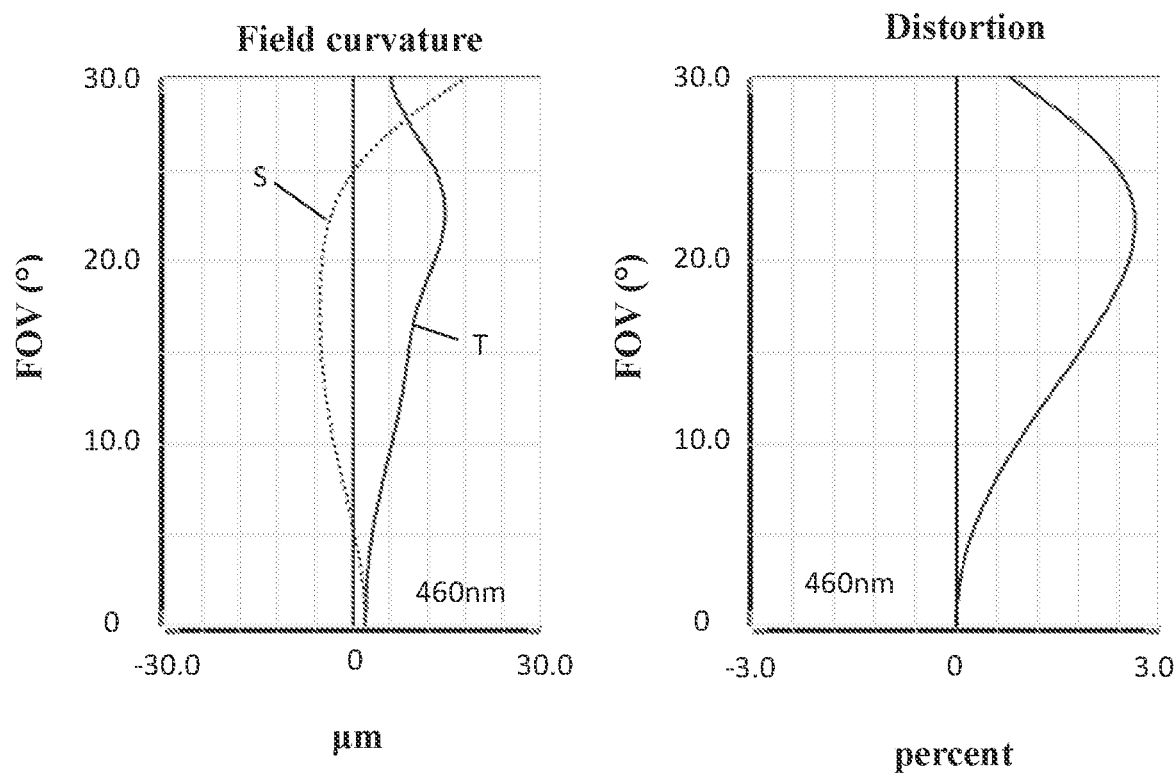
FIG. 16 shows a schematic diagram of a field curvature and a distortion of the camera optical lens shown in FIG. 13.

FIG. 14 and FIG. 15 illustrate a longitudinal aberration and a lateral color of light with wavelengths of 460 nm, 540 nm and 620 nm after passing the camera optical lens 40 according to Embodiment 4. FIG. 16 illustrates a field curvature and a distortion of light with a wavelength of 460 nm after passing the camera optical lens 40 according to Embodiment 4.

Table 17 in the following shows various values of Embodiment 4 and values corresponding to parameters which are specified in the above conditions. Obviously, Embodiment 4 satisfies the above conditions.

In the embodiment, an entrance pupil diameter (ENPD) of the camera optical lens 40 is 5.200 mm, an image height IH of 1.0H is 7.500 mm, an FOV (field of view) in the diagonal direction is 60.00°. The camera optical lens can meet the design requirements of a large aperture, a wide angle and ultra-thin, and its on-axis and off-axis chromatic aberrations are fully corrected, thereby achieving excellent optical characteristics.

TABLE 17

| Parameters and conditions | Embodiment 1 | Embodiment 2 | Embodiment 3 | Embodiment 4 |
|---|---|---|---|---|
| f | 11.540 | 12.348 | 12.312 | 12.813 |
| f1 | 7.252 | 11.927 | 6.756 | 8.438 |
| f2 | −14.101 | −13.352 | −24.729 | −17.72 |
| f3 | −14.424 | −4937.24 | −11.039 | −16.670 |
| f4 | −146.518 | 443.926 | −32.891 | −81.369 |
| f5 | 9.392 | 10.915 | 9.609 | 10.140 |
| f6 | −9.472 | −10.086 | −11.121 | −11.449 |
| f12 | 13.235 | 52.241 | 8.923 | 14.657 |
| (d1 + d3 + d5 + d7 + d9)/d11 | 1.21 | 1.01 | 1.28 | 2.15 |
| (R5 + R6)/(R5 − R6) | −1.84 | −116.64 | −1.01 | −1.01 |
| FOV | 65.50° | 62.20° | 62.08° | 60.00° |
| TTL | 13.041 | 14.600 | 13.990 | 14.599 |
| IH | 7.500 | 7.500 | 7.500 | 7.500 |
| FNO | 2.22 | 2.37 | 2.37 | 2.46 |

The above is only illustrates some embodiments of the present disclosure, in practice, one having ordinary skill in the art can make various modifications to these embodiments in forms and details without departing from the scope of the present disclosure.

What is claimed is:

1. A camera optical lens comprising, from an object side to an image side, a first lens having a positive refractive power;
a second lens having a negative refractive power;
a third lens having a negative refractive power;
a fourth lens;
a fifth lens having a positive refractive power; and
a sixth lens having a negative refractive power;

wherein the camera optical lens satisfies following conditions:

$$1.00 \leq (d1+d3+d5+d7+d9)/d11 \leq 2.20; \text{ and}$$

$$(R5+R6)/(R5-R6) \leq -1.00;$$

where
d1 denotes an on-axis thickness of the first lens;
d3 denotes an on-axis thickness of the second lens;
d5 denotes an on-axis thickness of the third lens;
d7 denotes an on-axis thickness of the fourth lens;
d9 denotes an on-axis thickness of the fifth lens;
d11 denotes an on-axis thickness of the sixth lens;
R5 denotes a curvature radius of an object-side surface of the third lens; and
R6 denotes a curvature radius of an image-side surface of the third lens.

2. The camera optical lens according to claim 1 further satisfying following condition:

$$-2.10 \leq f2/f \leq -1.00;$$

where
f denotes a focal length of the camera optical lens; and
f2 denotes a focal length of the second lens.

3. The camera optical lens according to claim 1 further satisfying following condition:

$$-3.00 \leq R10/R9 \leq -1.00;$$

where
R9 denotes a curvature radius of an object-side surface of the fifth lens; and
R10 denotes a curvature radius of an image-side surface of the fifth lens.

4. The camera optical lens according to claim 1 further satisfying following conditions:

$$0.27 \leq f1/f \leq 1.45;$$

$$-1.10 \leq (R1+R2)/(R1-R2) \leq 0.33; \text{ and}$$

$$0.03 \leq d1/TTL \leq 0.10;$$

where
f denotes a focal length of the camera optical lens;
f1 denotes a focal length of the first lens;
R1 denotes a curvature radius of an object-side surface of the first lens;
R2 denotes a curvature radius of an image-side surface of the first lens; and
TTL denotes a total optical length from the object-side surface of the first lens to an image surface of the camera optical lens along an optical axis.

5. The camera optical lens according to claim 1 further satisfying following conditions:

$$1.49 \leq (R3+R4)/(R3-R4) \leq 5.29; \text{ and}$$

$$0.01 \leq d3/TTL \leq 0.05;$$

where
R3 denotes a curvature radius of an object-side surface of the second lens;
R4 denotes a curvature radius of an image-side surface of the second lens; and
TTL denotes a total optical length from an object-side surface of the first lens to an image surface of the camera optical lens along an optical axis.

6. The camera optical lens according to claim 1 further satisfying following conditions:

$$-799.68 \leq f3/f \leq -0.60; \text{ and}$$

$$0.01 \leq d5/TTL \leq 0.06;$$

where
f denotes a focal length of the camera optical lens;
f3 denotes a focal length of the third lens; and
TTL denotes a total optical length from an object-side surface of the first lens to an image surface of the camera optical lens along an optical axis.

7. The camera optical lens according to claim 1 further satisfying following conditions:

$$-250.39 \leq f4/f \leq 530.93;$$

$$-185.55 \leq (R7+R8)/(R7-R8) \leq 30.09; \text{ and}$$

$$0.01 \leq d7/TTL \leq 0.04;$$

where f denotes a focal length of the camera optical lens;
f4 denotes a focal length of the fourth lens;
R7 denotes a curvature radius of an object-side surface of the fourth lens;
R8 denotes a curvature radius of an image-side surface of the fourth lens; and
TTL denotes a total optical length from an object-side surface of the first lens to an image surface of the camera optical lens along an optical axis.

8. The camera optical lens according to claim 1 further satisfying following conditions:

$$0.39 \leq f5/f \leq 1.33;$$

$$-0.99 \leq (R9+R10)/(R9-R10) \leq -0.02; \text{ and}$$

$$0.02 \leq d9/TTL \leq 0.14;$$

where
f denotes a focal length of the camera optical lens;
f5 denotes a focal length of the fifth lens;
R9 denotes a curvature radius of an object-side surface of the fifth lens;
R10 denotes a curvature radius of an image-side surface of the fifth lens; and
TTL denotes a total optical length from an object-side surface of the first lens to an image surface of the camera optical lens along an optical axis.

9. The camera optical lens according to claim 1 further satisfying following conditions:

$$-1.18 \leq f6/f \leq -0.54;$$

$$0.03 \leq (R11+R12)/(R11-R12) \leq 0.39; \text{ and}$$

$$0.06 \leq d11/TTL \leq 0.29;$$

where
f denotes a focal length of the camera optical lens;
f6 denotes a focal length of the sixth lens;
R11 denotes a curvature radius of an object-side surface of the sixth lens;
R12 denotes a curvature radius of an image-side surface of the sixth lens; and
TTL denotes a total optical length from an object-side surface of the first lens to an image surface of the camera optical lens along an optical axis.

10. The camera optical lens according to claim 1 further satisfying following condition: $TTL/IH \leq 1.95$;
where
TTL denotes a total optical length from an object-side surface of the first lens to an image surface of the camera optical lens along an optical axis; and
IH denotes an image height of the camera optical lens.

* * * * *